(12) United States Patent
Lei et al.

(10) Patent No.: US 8,406,314 B2
(45) Date of Patent: Mar. 26, 2013

(54) TWO-DIMENSIONAL DPCM WITH PCM ESCAPE MODE

(75) Inventors: Shawmin Lei, Camas, WA (US); Yeping Su, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 1296 days.

(21) Appl. No.: 11/946,298

(22) Filed: Nov. 28, 2007

(65) Prior Publication Data

US 2009/0135921 A1 May 28, 2009

(51) Int. Cl.
*H04B 14/04* (2006.01)
*H04B 14/06* (2006.01)
*G06K 9/36* (2006.01)
*G06K 9/46* (2006.01)

(52) U.S. Cl. ............... 375/242; 375/244; 382/238

(58) Field of Classification Search ............. 375/240.16, 375/240.25, 240.26, 240.27, 245; 382/238, 382/239, 244

See application file for complete search history.

(56) References Cited

U.S. PATENT DOCUMENTS

| | | | |
|---|---|---|---|
| 4,023,199 A | 5/1977 | Netravali et al. | |
| 4,369,463 A | 1/1983 | Anastassiou et al. | |
| 4,573,167 A | 2/1986 | Hentschke et al. | |
| 5,128,963 A | 7/1992 | Akagiri | |
| 5,376,968 A | 12/1994 | Wu et al. | |
| 5,696,791 A * | 12/1997 | Yeung | 375/244 |
| 6,744,929 B1 * | 6/2004 | Okada | 382/251 |
| 6,983,017 B2 | 1/2006 | Chen et al. | |
| 2001/0043750 A1 * | 11/2001 | Kondo et al. | 382/238 |
| 2004/0202375 A1 * | 10/2004 | Kalevo | 382/239 |
| 2005/0162566 A1 * | 7/2005 | Chuang et al. | 348/714 |
| 2008/0131087 A1 * | 6/2008 | Lee et al. | 386/112 |
| 2008/0147980 A1 * | 6/2008 | Peters et al. | 711/133 |
| 2009/0052790 A1 * | 2/2009 | Odagiri et al. | 382/238 |
| 2009/0196347 A1 * | 8/2009 | Chen et al. | 375/240.03 |

* cited by examiner

*Primary Examiner* — Hassan Phillips
*Assistant Examiner* — Saba Tsegaye
(74) *Attorney, Agent, or Firm* — Brooks Acordia IP Law, PC; Pejman Yedidsion; David Ripma

(57) ABSTRACT

Methods of, and devices, and systems for differential pulse code modulation (DPCM) having predictions and quantization parameters based on proximate lines of buffered quanta of information where pulse code modulation (PCM) is employed as a backup means.

22 Claims, 16 Drawing Sheets

```
BitsSent = 5
QuantPCM = 5    //QP of PCM
for each pixel {
            Quant = QuantTable[neighbors_modes]
            Predictorcolor = form_predictor(Acolor, Bcolor, Ccolor)
            //A is the left pixel, B the upper pixel, C is the upper left pixel
            for each color in (R,G,B){
                        Dcolor = Current_Datacolor + 2^(Quant-1)
                        // the plus 2 to the power of (Quant-1) is for rounding
                        if(Dcolor<-MaxABS OR Dcolor >= MaxABS){
                                    OutOfRangecolor = 1;
                        }else{
                                    OutOfRangecolor = 0;
                        }
                        if(abs(Ccolor-Acolor<abs(Ccolor-Bcolor)){
                                    Dircolor = 1;
                        }else{
                                    Dircolor=0;
                        }
            }
            if( ( DirR + DirG + DirB) > 1)
                        Quant = Quant of the upper pixel B
            MaxABS = 2^(BitsSent+Quant-1) + ExtendedRange
            if (OutOfRangeR==1 OR OutOfRangeG==1 OR OutOfRangeB==1){
                        current_flag = 1
            }else{
                        current_flag = 0
            }
            write(current_flag)  // 1 bit
```

810 — (Dcolor / OutOfRange block)
814 — (Dircolor block)
816 — (if DirR+DirG+DirB block)
812 — (MaxABS / current_flag block)

FIG. 8A

```
//Encode data
for each color in (R,G,B){
        if (current_flag==1){  // PCM Escape Mode
                output = (Current_Datacolor + 2^(QuantPCM-1) >>QuantPCM
                        // + 2to the power of (QuantPCM-1) is for rounding
820     if (output >= 2^BitsSent)
                        output = 2BitsSent – 1      // overflow protection
        } else {                    // DPCM Mode
                output = Dcolor  >> Quant
                if (output >= 2BitsSent-1) output = 2^(BitsSent-1) – 1
                        // overflow protection
830     else if (output < -2^(BitsSent-1)) output = -2^(BitsSent-1)
                        // underflow protection
        }
    // Note that output is in 2's complement
    //     representation for negative number
    write(the least significant BitsSent bits of output)   // 5 bits
    }
    neighbors_modes = update_neighbors_modes(current_flag)
}
```

FIG. 8B

```
BitsSent = 5
for each pixel {                                                    1010
        Quant = QuantTable[neighbors_modes]
        Predictorcolor=form_predictor(Acolor, Bcolor, Ccolor)// A is the left pixel,
                // B is the upper pixel, C is the upper left pixel
        for each color (R, G, B){
1020            if (abs(Ccolor – Acolor) <abs(Ccolor – Bcolor)){
                        Dircolor = 1;
                }else{
                        Dircolor = 0;
                }
        }
        if ((DirR + DirG + DirB > 1)                              1030
                Quant = Quant of the upper pixel B
        // Decode data
1040    current_flag = read(1 bit)           // Read in the current_flag (1 bit)
        for each color in (R, G, B) {
                if (current_flag == 1) {  // PCM Escape Mode
                        Current_Datacolor  = read(BitsSent bits)<<QuantPCM
1050            } else {                          // DPCM Mode
                        temp = read(BitSent bits) and extend the sign bit
                        Current_Datacolor = (temp << Quant) + Predictorcolor
                }
        }
        neighbors_modes=update_neighbors_modes(current_flag)
}
```

FIG. 10

TWO-DIMENSIONAL DPCM WITH PCM ESCAPE MODE

FIELD OF ENDEAVOR

The embodiments of the present invention relate to data compression, particularly data compression employing two-dimensional differential pulse-code modulation.

BACKGROUND

With the proliferation of digital data, techniques of compressing data are desirable to minimize, for example, storage space or data being transmitted between a sender and a receiver. Such compression techniques may be used in various applications, such as, but not limited to, image processors, analog-to-digital converters, coders, e.g., encoder and/or decoders, buffer storage, and streaming data transmission. Methods, devices, and systems that provide compression technology are thus highly desirable.

SUMMARY

The invention in its several embodiments includes methods of, and devices, and systems for differential pulse code modulation (DPCM) having predictions and quantization parameters based on proximate lines of buffered quanta of information where pulse code modulation (PCM) is employed as a backup means of transmission. PCM in the exemplary embodiments may include both quantizing and inverse quantizing. DPCM in the exemplary embodiments may include both (a) encoding involving both a first predictor and a quantizer and (b) decoding involving both an inverse quantizer and a second predictor. For example, a method embodiment of processing a pixel of an array of pixels, such as a frame or image has the pixels each comprised of a plurality of pixel components, and the method comprising steps, not necessarily in the order, of: (a) buffering a first set of pixels according to a first array scan direction; (b) buffering a second set of pixels according to a second array scan direction; (c) encoding, e.g., quantizing involving a predictor, a current pixel for buffering to become a member of the second set of pixels, wherein, for each current pixel component, the encoding scheme generally comprises: (i) predicting a current pixel component based on a pixel component of a last buffered pixel of the second set of pixels and a pixel component of at least one pixel of the first set of pixels proximate to the current pixel; (ii) differencing the predicted current pixel component and the current pixel component to generate a current pixel component difference; and (iii) if the current pixel component difference exceeds a threshold, then (A) quantizing each current pixel component of the current pixel to generate a quantized current pixel and (B) combining the quantized current pixel with a pulse code modulation (PCM) indicator for transmission; and (d) quantizing each current pixel component difference to generate a quantized current pixel difference and combining the quantized current pixel difference with a differential pulse code modulation (DPCM) indicator for transmission. In addition, the quantizing of each current pixel component difference may be based on one or more differences between a pixel component of the last buffered pixel of the second set of pixels and a pixel component of at least one pixel of the first set of pixels proximate to the current pixel. In some method embodiments, the steps of quantizing each current pixel component of the current pixel to generate a quantized current pixel and combining the quantized current pixel with a pulse code modulation (PCM) indicator for transmission are executed if either: (a) the current pixel component difference exceeds a threshold or (b) the absolute value of DPCM quantization error exceeds the absolute value of PCM quantization error.

Another exemplary method embodiment of processing a pixel of an array of pixels, where the pixels each comprise a plurality of pixel components, is disclosed where the method comprises steps, not necessarily in the order, of: (a) buffering a first set of pixels comprising decoded pixel components according to a first array scan direction; (b) buffering a second set of pixels comprising decoded pixel components according to a second array scan direction; (c) receiving data comprising an encoding indicator and pixel data; and (d) if the encoding indicator, or quantizing indicator, is a pulse code modulation (PCM) indicator, then decoding, e.g., inverse quantizing, the pixel data as a quantized current pixel; but (e) if the encoding, or quantizing, indicator is a differential pulse code modulation (DPCM) indicator, then: (i) decoding, e.g., inverse quantizing involving a predictor, the pixel data as a quantized current pixel component difference to generate a decoded, or inverse quantized, current pixel component difference; (ii) predicting a current pixel component based on a decoded pixel component of a last buffered pixel of the second set of pixels and a decoded pixel component of at least one pixel of the first set of pixels proximate to the current pixel; (iii) summing the predicted current pixel component and the decoded current pixel component difference to generate a current decoded pixel component; and (iv) buffering the current decoded pixel component. In addition, the exemplary method may have the decoding of each current pixel component difference based on one or more differences between a buffered decoded e.g., inverse quantized, pixel component of the last buffered decoded pixel of the second set of pixels and a buffered decoded, e.g., inverse quantized, pixel component of at least one pixel of the first set of buffered pixels proximate to the current pixel. In addition, the quantization modes of the pixel components may also be an additional basis for inverse quantizing. That is, the method may be executed via a processing system or a processing subsystem where the processing system or subsystem may execute steps to decode, e.g., inverse quantize, each current pixel component difference based on the quantization mode of a buffered decoded pixel component of the last buffered decoded pixel of the second set of pixels and the quantization mode of the buffered decoded pixel component of at least one pixel of the first set of buffered pixels proximate to the current pixel.

An exemplary device or apparatus for processing a pixel of an array of pixels, where the pixels each comprised of a plurality of pixel components, may be an apparatus comprising: a processing subsystem and addressable memory wherein the addressable memory is adapted to buffer a first set of pixels according to a first array scan direction and a second set of pixels according to a second array scan direction; and wherein the processing subsystem is adapted to execute steps to: (a) encode, e.g., quantize with the involvement of a predictor, a current pixel for buffering to become a member of the second set of pixels, wherein, for each current pixel component, the processing subsystem is adapted to execute steps to: (i) predict a current pixel component based on a pixel component of a last buffered pixel of the second set of pixels and a pixel component of at least one pixel of the first set of pixels proximate to the current pixel; (ii) difference the predicted current pixel component and the current pixel component to generate a current pixel component difference; and (iii) if the current pixel component difference exceeds a threshold, then (A) quantize each current pixel component of the current pixel to generate a quantized current pixel and (B)

combine the quantized current pixel with a pulse code modulation (PCM) indicator for transmission; and (b) quantize each current pixel component difference to generate a quantized current pixel difference and combine the quantized current pixel difference with a differential pulse code modulation (DPCM) indicator for transmission. In addition, the processing subsystem of the exemplary apparatus may be further adapted to execute steps to quantize each current pixel component difference based on one or more differences between a pixel component of the last buffered pixel of the second set of pixels and a pixel component of at least one pixel of the first set of pixels proximate to the current pixel. The processing subsystem of the exemplary apparatus may be further adapted to execute steps to quantize each current pixel component difference based on the quantization mode of a pixel component of the last buffered pixel of the second set of pixels and the quantization mode of a pixel component of at least one pixel of the first set of pixels proximate to the current pixel. In some apparatus embodiments, the processing subsystem is further adapted to execute steps to quantize each current pixel component of the current pixel to generate a quantized current pixel and combining the quantized current pixel with a pulse code modulation (PCM) indicator for transmission if either: (a) the current pixel component difference exceeds a threshold or (b) the absolute value of DPCM quantization error exceeds the absolute value of PCM quantization error.

An exemplary device or apparatus for processing a pixel of an array of pixels, where the pixels each comprise a plurality of pixel components, the exemplary apparatus may comprise: (a) a processing subsystem and addressable memory wherein the addressable memory is adapted to buffer: a first set of pixels comprising decoded, e.g., inverse quantized, pixel components according to a first array scan direction; a second set of pixels comprising decoded, e.g. inverse quantized, pixel components according to a second array scan direction; and a current decoded pixel component; and wherein the processing subsystem is adapted to execute steps to: (i) receive data comprising an encoding indicator and pixel data; (ii) decode, e.g., inverse quantize with the involvement of a predictor, the pixel data as a quantized current pixel if the encoding indicator is a pulse code modulation (PCM) indicator; and (iii) if the encoding indicator, or quantizing indicator is a differential pulse code modulation (DPCM) indicator, then the processing subsystem is adapted to execute steps to: (A) decode, or inverse quantize, the pixel data as a quantized current pixel component difference to generate a decoded current pixel component difference; (B) predict a current pixel component based on a decoded, e.g., inverse quantized, pixel component of a last buffered pixel of the second set of pixels and a decoded, e.g., inverse quantized, pixel component of at least one pixel of the first set of pixels proximate to the current pixel; and (C) sum the predicted current pixel component and the decoded current pixel component difference to generate a current decoded pixel component. The processing subsystem of the exemplary apparatus may be further adapted to execute steps to decode, e.g., inverse quantize involving a predictor, each current pixel component difference based on one or more differences between a buffered decoded pixel component of the last buffered decoded pixel of the second set of pixels and a buffered decoded pixel component of at least one pixel of the first set of buffered pixels proximate to the current pixel. In addition, the processing subsystem of the exemplary apparatus may be further adapted to execute steps to decode, e.g., inverse quantize involving a predictor, each current pixel component difference based on the quantization mode of a buffered decoded pixel component of the last buffered decoded pixel of the second set of pixels and the quantization mode of the buffered decoded pixel component of at least one pixel of the first set of buffered pixels proximate to the current pixel.

An exemplary system embodiment for processing a pixel of an array of pixels, where the pixels each comprise of a plurality of pixel components, may be a system that comprises: (a) at least one processing subsystem having addressable memory wherein the addressable memory is adapted to buffer a first set of pixels according to a first array scan direction and a second set of pixels according to a second array scan direction; and wherein the at least one processing subsystem is adapted to execute steps to: (i) encode, e.g., quantize involving a predictor, a current pixel for buffering to become a member of the second set of pixels, wherein, for each current pixel component, the processing subsystem is adapted to execute steps to: (A) predict a current pixel component based on a pixel component of a last buffered pixel of the second set of pixels and a pixel component of at least one pixel of the first set of pixels proximate to the current pixel; (B) difference the predicted current pixel component and the current pixel component to generate a current pixel component difference; and (C) if the current pixel component difference exceeds a threshold, then quantize each current pixel component of the current pixel to generate a quantized current pixel and combine the quantized current pixel with a pulse code modulation (PCM) indicator for transmission; and (i) quantize each current pixel component difference to generate a quantized current pixel difference and combine the quantized current pixel difference with a differential pulse code modulation (DPCM) indicator for transmission; and wherein the at least one processing subsystem having addressable memory wherein the addressable memory is further adapted to buffer: a first set of pixels comprising decoded pixel components according to a first array scan direction; a second set of pixels comprising decoded pixel components according to a second array scan direction; and a current decoded pixel component; and (b) wherein the at least one processing subsystem is further adapted to execute steps to: (i) receive data comprising an encoding indicator and pixel data; (ii) decode, e.g., inverse quantize, the pixel data as a quantized current pixel if the encoding, or quantizing, indicator is a pulse code modulation (PCM) indicator; and (iii) if the encoding, or quantizing, indicator is a differential pulse code modulation (DPCM) indicator, then the processing subsystem is adapted to execute steps to: (A) decode the pixel data as a quantized current pixel component difference to generate a decoded current pixel component difference; (B) predict a current pixel component based on a decoded pixel component of a last buffered pixel of the second set of pixels and a decoded pixel component of at least one pixel of the first set of pixels proximate to the current pixel; and (C) sum the predicted current pixel component and the decoded current pixel component difference to generate a current decoded pixel component. The at least one processing subsystem of the exemplary system may be further adapted to execute steps to quantize each current pixel component difference based on one or more differences between a pixel component of the last buffered pixel of the second set of pixels and a pixel component of at least one pixel of the first set of pixels proximate to the current pixel. In addition, the at least one processing subsystem of the exemplary system may be further adapted to execute steps to decode each current pixel component difference based on one or more differences between a buffered decoded pixel component of the last buffered decoded pixel of the second set of pixels and a buffered decoded pixel component of at least one pixel of the first set of buffered pixels proximate to the current pixel. The at least one processing subsystem of the exemplary system may be further adapted to execute steps to decode, e.g., inverse quantize, each current pixel component difference based on the quantization mode of a buffered decoded pixel component of the last buffered decoded pixel of the second set of pixels and the quantization mode of a buffered decoded pixel component of at least one pixel of the first set of buffered pixels proximate to the current pixel. In some system embodiments, at least one processing subsystem is further adapted to execute steps to quantize each current pixel component of the current pixel to generate a quantized current pixel and combining the quantized current pixel with a pulse code modulation (PCM) indicator for transmission if either: (a) the current pixel component difference exceeds a threshold or (b) the absolute value of DPCM quantization error exceeds the absolute value of PCM quantization error.

BRIEF DESCRIPTION OF THE DRAWINGS

The present invention is illustrated by way of example and not limitation in the figures of the accompanying drawings, and in which:

FIGS. 8A and 8B list an exemplary pseudo code of an encoding process embodiment according to an embodiment of the invention;

FIG. 10 lists an exemplary pseudo code of a decoding process embodiment according to an embodiment of the invention;

DETAILED DESCRIPTION

An analog portion of an image field may be represented in a digital or quantized form via circuitry, such as an analog-to-digital converter (ADC). The quantized portion of the analog image may be termed a pixel and the pixel may be transmitted and converted to an analog image for viewing via digital-to-analog circuitry, such as a digital-to-analog converter (DAC). A pixel may also represent logically the luminance and/or chrominance of a portion of an image, field or frame. In a color component representation such as red, green, blue (RGB), the pixel may be represented as a vector having three elements. Transmission of the pixel, or quantized sample of a portion of the analog image, may be via pulse code modulation (PCM) where the quantization of the pixel includes encoding the amplitude of a pixel or the amplitude of an element according to levels that may be represented by a power of two bits. At a transmitting end, or origin, of a communication circuit, the output of a PCM may be a time series of binary numbers, each represented by a power of two bits. At a receiving end, or destination, of the communications circuit, a pulse code demodulator may convert the binary numbers back into pulses having the same quantum level as those prior to modulation. Accordingly, the code words of PCM represent the sampled pixels of the image field. These pulses may be further processed, e.g., via a DAC, to restore, in part, the original analog portion of the image. The code words of PCM represent the sampled pixels of the image field.

In addition to PCM, forms of predictive coding may be used in the transmission of the pixel, or quantized sample of a portion of the analog image. For example, differential pulse code modulation (DPCM) may be applied to encode the difference between the pixel and a prediction of the pixel. The difference value, or error, may be encoded in a fashion similar to that explained above for PCM. Accordingly, DPCM code words represent differences between samples. At a receiving end, or destination, of the communications circuit, the decoding of DPCM code words requires a prediction process similar or identical to the prediction process applied to yield the difference value. Thereafter, the decoded pulses may be further processed, e.g., via a DAC, to restore, in part, the original analog portion of the image.

Figure 1B:
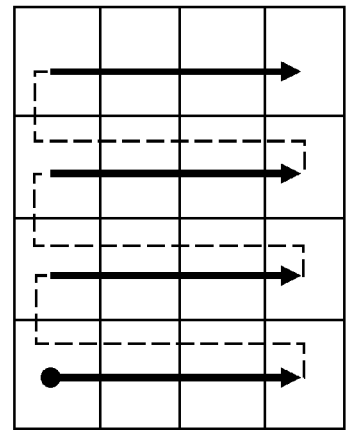
FIGS. 1A, 1B, and 1C illustrate exemplary scan patterns illustrating exemplary manners, or orders, in which an image may be processed, or scanned, pixel by pixel, according to embodiments of the invention.
Figure 2A:
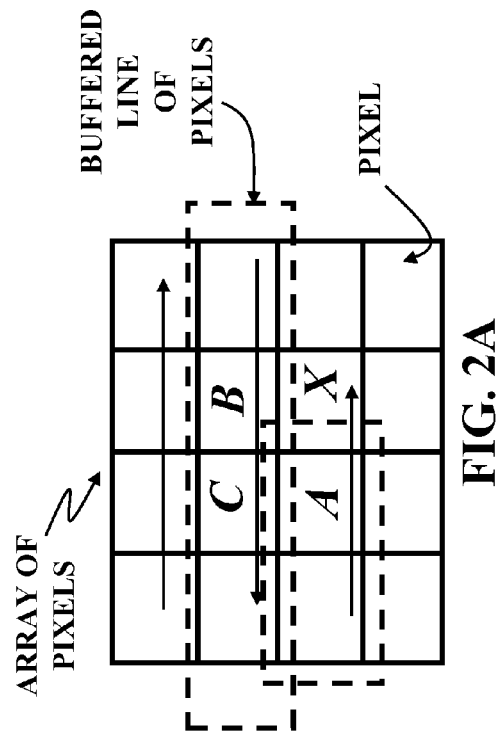
FIG. 2A illustrates an exemplary scan pattern across an array of pixels and buffered portions.
Figure 1A:
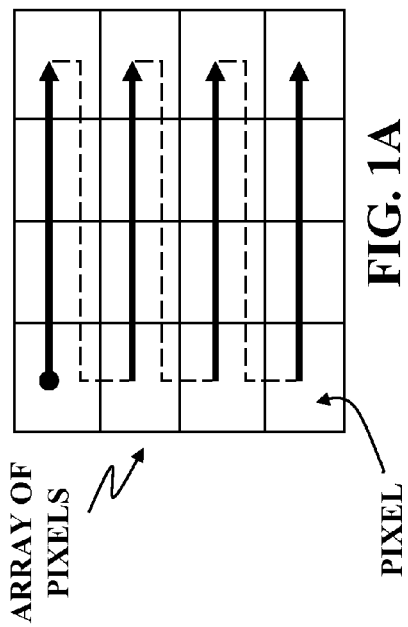
Figure 1C:
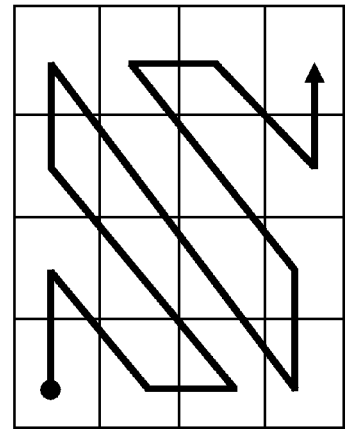

FIGS. 1A-1C show an image field that may be represented by an array of pixels and various scanning or pixel order of processing patterns thereof. Each pixel may represent a portion of the image field in a quantized form. In general, an image field may be processed line by line or frame by frame. The quantization process of each pixel may be performed in a serial fashion, i.e., pixel-by-pixel. FIG. 1A shows the image field as a two-dimensional array of pixels being processed in a horizontal raster scan pattern. FIG. 1B shows the image field being processed column by column, such as a vertical raster scan pattern. FIG. 1C shows an image being processed in a zigzag, or diagonal, scan pattern. FIG. 2A shows a horizontal scanning pattern where a row of pixels has been processed and buffered that includes pixels "B" and "C" and a row is being processed and buffered that includes pixel "A" and is presently processing pixel "X." Pixels that are buffered and spatially near pixel "X" may be termed members of the neighbor pixel buffer and in FIG. 2A may include pixels A, B, and C. In some embodiments, a quantization process may be applied to code still or moving images. The still images or frames are each typically divided into pixels, and a quantization process is applied to code each pixel. In some embodiments, the encoder and decoder modules reside in the same image processing system or device.

Figure 2B:
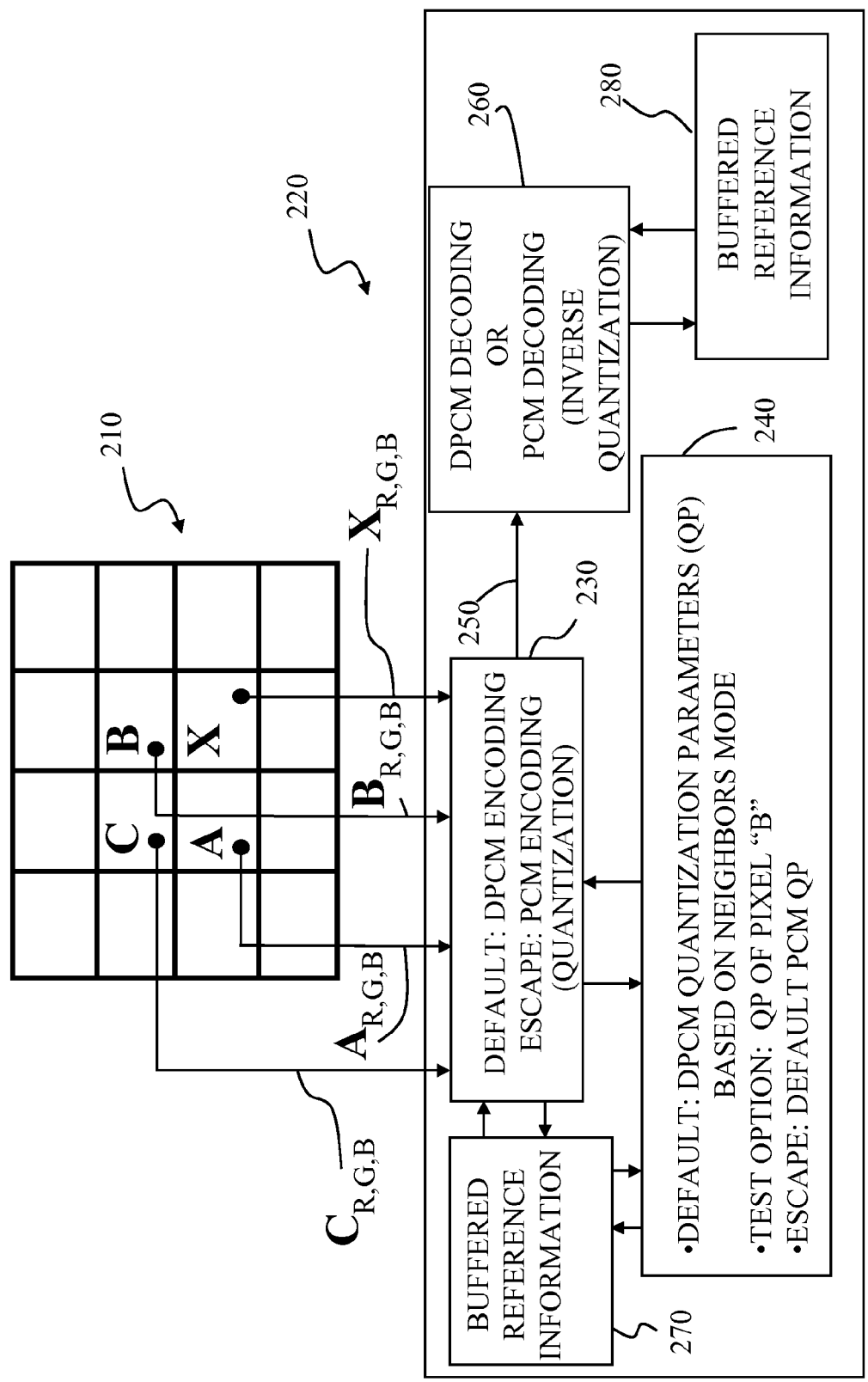
FIG. 2B is a high-level functional block diagram illustrating the relationship of a scanned and buffered array of pixels and an exemplary encoding (quantizing) and decoding (inverse quantizing) system.

FIG. 2B combines the graphical depiction of an image of pixels 210 with a top level function block diagram of the system 220 which may be part of an image processing system or device or a networked plurality of processing nodes. Pixels C and B, are of the preceding buffered line of pixels and pixel A is the most recently processed pixel of the line of pixels comprising pixel X. The system 220 has an encoding process 230 that may be executed where the default encoding is DPCM and, in the event conditions such as a color component prediction error are out of an acceptable range, an escape mode of PCM encoding may be invoked. The encoding process may be based on quantization parameters 240 and both the quantization parameters 240 and encoding process 230 may rely on a buffer of information pertaining to previously processed pixels 270. If in the PCM escape mode, the quantization parameters for PCM encoding may be fixed a priori. The default quantization parameters for DPCM encoding may be based on those of a previous pixel, such as pixel A. A comparison of the absolute differences between A and C, and between B and C, may invoke the use of the quantization parameters based on B, i.e., based on a buffered pixel of the buffered line of pixels where the reference pixel is spatially above X the present pixel of interest for encoding. The pixel X, encoded color element or component by color element or component, may then be transmitted 250 to a decoding process 260 of the system where, depending on the type of encoding that may be signaled to the decoding process, e.g., via an inserted flag, the DPCM or PCM decoding may be done. If DPCM decoding is indicated, then along with the use of color component information for pixels A, B, and C in the prediction process, buffered reference information 280 may be applied on the decoding side to determine the quantization parameters that were used in the encoding process, i.e., whether the quantization parameters of pixel B were used in place of pixels of the same line as X.

Figure 3:
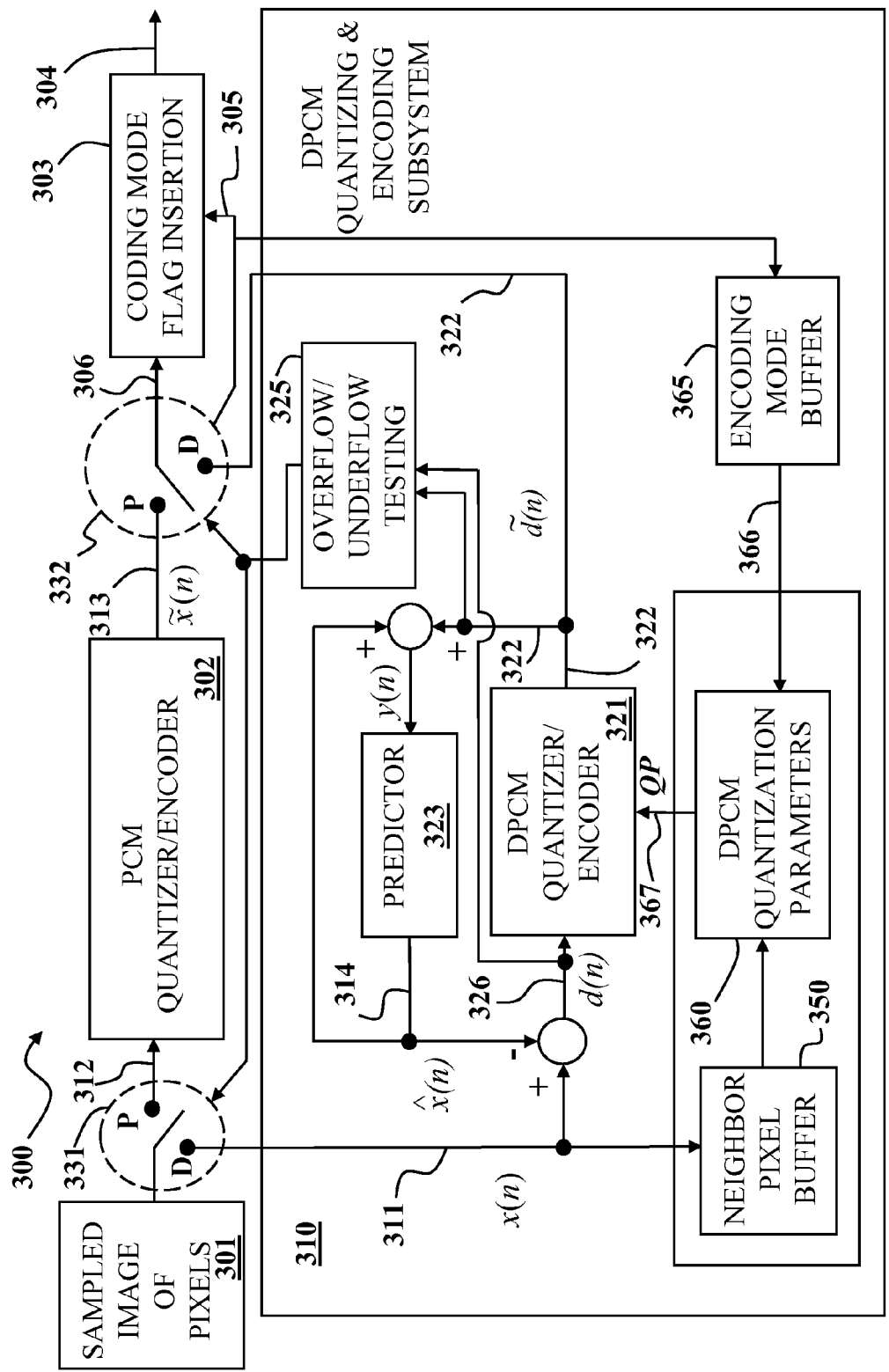
FIG. 3 is a high-level functional block diagram of a encoding module or subsystem adapted to perform quantization processes, according to embodiments of the invention.

FIG. 3 shows a functional block diagram of an exemplary transmitting end 300, or origin, portion of an exemplary system of the present invention. An image of pixels 301 may be sampled and the sampled pixels may be processed via a PCM path having a PCM quantizer and PCM encoder 302 or the sampled pixel may be processed via a DPCM path having a DPCM quantizer/encoder 321, and a DPCM predictor 323. The exemplary system may further include an overflow/underflow testing process 325 where, depending on the condition of the prediction error 326 and, optionally, the output 322 of the DPCM quantizer 321, the system 300 may transmit pixels via PCM or DPCM encoding. The change in coding mode is reflected symbolically in the functional block diagram as a pair of switches 331, 332. The switches may both be set to state "P" for PCM coding and state "D" for DPCM coding. The coding mode 303 may be inserted, via an insertion process 304, into the bit stream to serve as a flag for the receiving end, or destination, as to which decoding mode to apply to the received bit stream. The quantization process that includes the encoding may be based on the coding modes of the neighboring pixels of the input pixel, X. In addition, the exemplary system 300 may sample a pixel and/or pixels of a neighbor pixel buffer 350 and adjust the DPCM quantization parameters via a process 360 based on such a sampled set.

An exemplary DPCM coder module 310 of FIG. 3 processes adjacent sample differences or $[x(n)-x(n-1)]$, where $x(n)$ 311 is the nth sample being processed by the exemplary coder 310 of the present invention. The exemplary DPCM coder module 310 of FIG. 3 has a prediction module 323 or predictor, which projects an expected value of $x(n)$ 311 based on one or more previous quantized pixels. The predicted value 314 is represented as $\hat{x}(n)$. Continuing with the example, each sample is a pixel and such pixel is represented in digital form. The exemplary coder module 310 is generally adapted to represent the input pixel as a representation having fewer number bits than a PCM coder of similar signal-to-noise ratio (SNR). For example, the coder module 310 may reduce the $x(n)$ digital input 311 of ten bits to a coded data 322 of six bits.

Generally, in the PCM phase or mode of processing, the digital input $x(n)$ 312 is processed by a quantization module 302. Generally, the process of quantization relates to rounding off or approximating a value to one of the closest quantized levels. Described in another way, the input value $x(n)$ 312 is quantized to one of N levels or steps. Each level or step is typically assigned a value and a code representing such a value. The quantization module 302, for example, may provide six quantized steps. Because this is an exemplary number of quantized steps, other application-appropriate numbers of quantized steps may be employed and yet still be in the scope of the present invention. The output of the quantization module 302 is the quantized value of $x(n)$ that has been encoded according to a PCM codeword map and such output may be represented as $\tilde{x}(n)$ 313 and but for a quantization error, if decoded, would be the same value as $x(n)$.

As for the DPCM phase or mode of processing, the input 326 to the DPCM quantization module 321 is typically a prediction error or difference signal, $d(n)$ 326, such that $d(n)=x(n)-\hat{x}(n)$, where $\hat{x}(n)$ 314 is a prediction of $x(n)$ 311. The prediction $\hat{x}(n)$ 314 may be generated by the predictor module 323. The difference signal or prediction error 326, $d(n)$, represented by $d(n)=x(n)-\hat{x}(n)$, is quantized by the quantization (DPCM encoding) module 321 based on a quantization parameter (QP) 367 to generate the quantized prediction error $\tilde{d}(n)$ 322, where $\tilde{d}(n)=d(n)-q(n)$ and where $q(n)$ is the DPCM quantization error.

The encoding system 300 may be in a DPCM mode by having the symbolic switches 331, 332 set to "D" or may be in a PCM mode by having the symbolic switches 331, 332 set to "P." Depending on the encoding mode setting, the sampled pixel $x(n)$ 311 may be output to a receiving module or buffered via a frame buffer for further image processing, such as a PCM quantized and encoded value of $x(n)$—i.e., $\tilde{x}(n)$ 313, or as a quantized and encoded difference signal or prediction error $\tilde{d}(n)$ 322.

The final output 304 of the encoding system 300 may be via a coding mode flag insertion process 303. The encoding mode may be represented via a single bit. For example, a coding mode of "0" may indicate the pixel is encoded in DPCM mode, "D," with an output of DPCM data, and a coding mode of "1" may be used to indicate a pixel encoded, e.g., quantized, in PCM mode, "P," with an output of PCM data. For decoding, e.g., inverse quantizing, efficiency, the encoding mode 305 may lead the output, i.e., be transmitted first, and then be followed by the encoded data 306. The output 304 may also be stored in a frame buffer or passed directly to a decoding process.

The predictor module 323 may apply various prediction processes and/or algorithms as machine-readable steps for execution by a processing module having a processing unit and addressable memory. In some embodiments, the predictor module 323 applies linear prediction to obtain x̂(n) 314. This may be represented by $$\hat{x}(n) = \sum_{j=1}^{N} h_j y(n-j)$$

where H={$h_j$} and j=1, 2, ..., N, which is a set of predictor coefficients and where y(n−j) represents the sum of x̂(n−j) and the previously quantized value of d(n−j). In some embodiments, the predictor module 323 may be an all-zero predictor module.

The coding, e.g., quantizing, mode of x(n) 305 may be applied to update a mode buffer 365. The mode buffer 365 in general contains the coding modes of previously encoded pixels or samples. These previously encoded pixels may be neighboring pixels of the input pixel x(n). From the encoding modes, or quantizing modes, of previously encoded, e.g., quantized, pixels 365, the neighbor_modes value 366 may be applied by the DPCM quantization parameters module 360 to obtain a quantization parameter 367, QP, which may then used by the DPCM quantizer 321.

Figure 4:
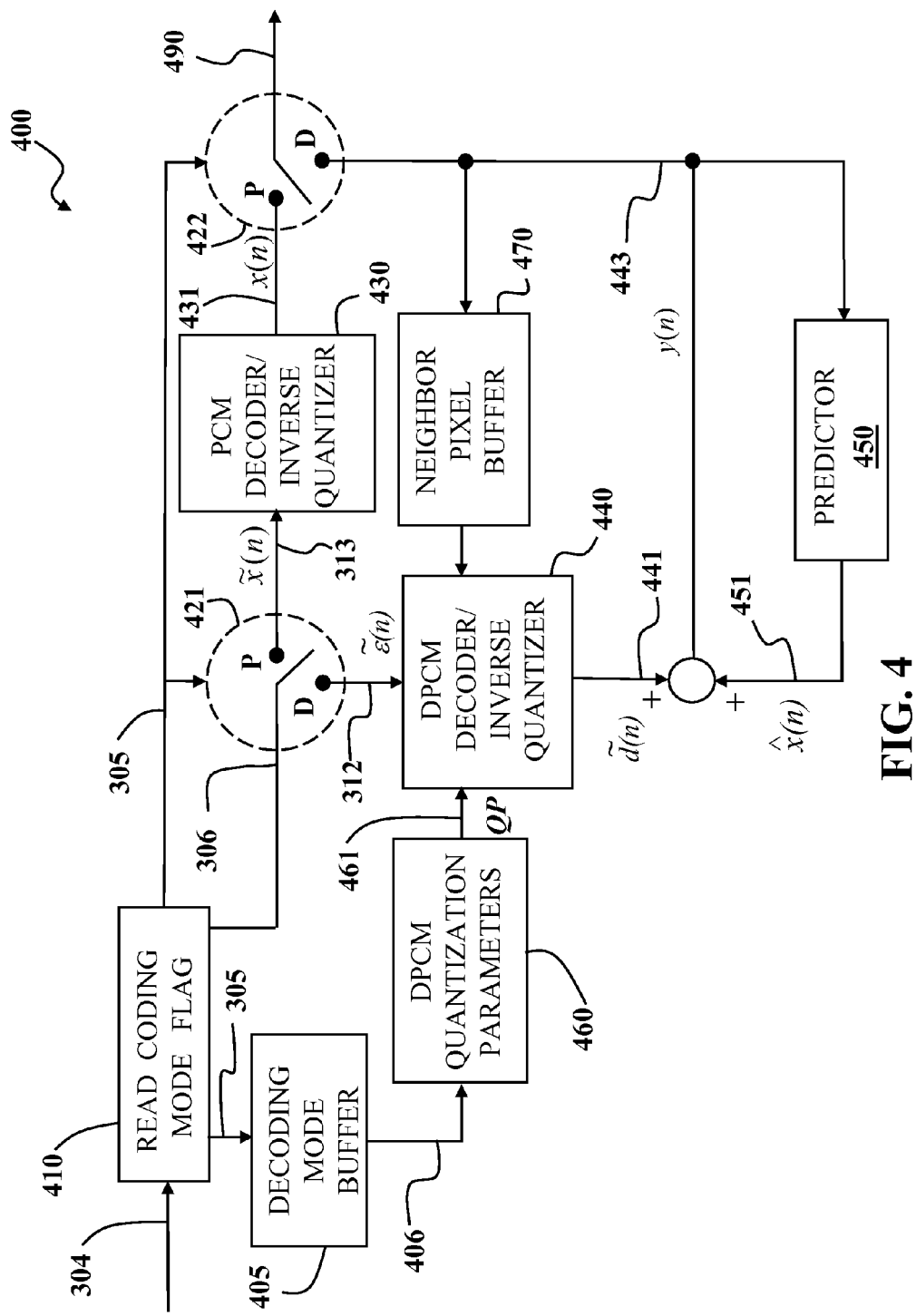
FIG. 4 is a high-level functional block diagram of a decoding module or subsystem adapted to perform quantization processes, according to embodiments of the invention.

FIG. 4 shows a functional block diagram of an exemplary receiving end 400, or destination, portion of an exemplary system of the present invention. Upon receiving the bit stream 304, the coding mode flag may be recognized via a monitoring process 410 and a decoding, e.g., inverse quantizing, path may be selected based on the recognized flag. The decoding path selection may be illustrated symbolically to be a pair of switches 421, 422. The switches may both be set to state "P" for PCM decoding via a PCM decoder 430 and state "D" for DPCM decoding via a DPCM decoder 440. If PCM decoding is determined to be applied, the PCM decoder output maybe represented as a decoded pixel value 431 based on the encoded bit stream 313. As part of the DPCM decoding, the output 451 of a DPCM predictor 450 may be applied to the decoded, e.g., inverse quantized, difference signal 441 in order to generate a decoded, e.g., inverse quantized, pixel value 443 via the DPCM path. The DPCM predictor 450 may base its prediction 451 on the previous value of the decoded pixel value 443.

The encoded pixel information 306 and encoding mode 305 (FIG. 3), may be received as a bit stream 304 by the receiving subsystem 400 as shown by example in FIG. 4. The received encoding mode of x(n) 305 is applied to update the decoding mode buffer 405. This process updates the decoding mode buffer 405 by storing the encoding mode 305 of the pixel currently being processed. Similar to the encoding mode buffer 365 of the encoder module, the decoding, e.g., inverse quantizing, mode buffer 405 of the receiving and decoding system contains the coding modes of previously coded/reconstructed samples or pixels. Based on the coding modes, or quantizing modes, of the appropriate number of previously coded pixels, the neighbor_modes value 406 is determined and may be applied by the DPCM quantization parameters module 460 so as to determine the appropriate QP 461 to be applied by the DPCM decoder 440 for decoding and inverse quantization.

If the coding mode 305 is set to PCM mode, the coded data 306, which is PCM encoded data 313 (FIG. 3), may be decoded and inversely quantized by a PCM decoding module 430, which may then be stored in a reconstructed pixel buffer. If the coding mode 305 indicates DPCM mode, the received coded data 306, which is DPCM encoded data 312 (FIG. 3), may be decoded and inversely quantized by the DPCM decoding and inverse quantization module 440 based on the appropriate QP 461. In general, if the decoding subsystem 400 receives DPCM data indicated with a DPCM coding mode, the output 490 of the exemplary decoder module 400 is generally based on adding the received DPCM encoded data, d(n), now decoded, e.g., inverse quantized, as the difference signal or pixel component prediction error 441 and the decoder version of the predicted pixel component 451 x̂(n), as represented after the summing as y(n) 443. If the decoder subsystem 400 receives PCM data indicated with a PCM coding mode, the output 490 of the exemplary decoder module 400 is the PCM decoded data 431 of the transmitted encoded PCM data 313, e.g. an encoded pixel component, x̃(n).

Figure 5A:
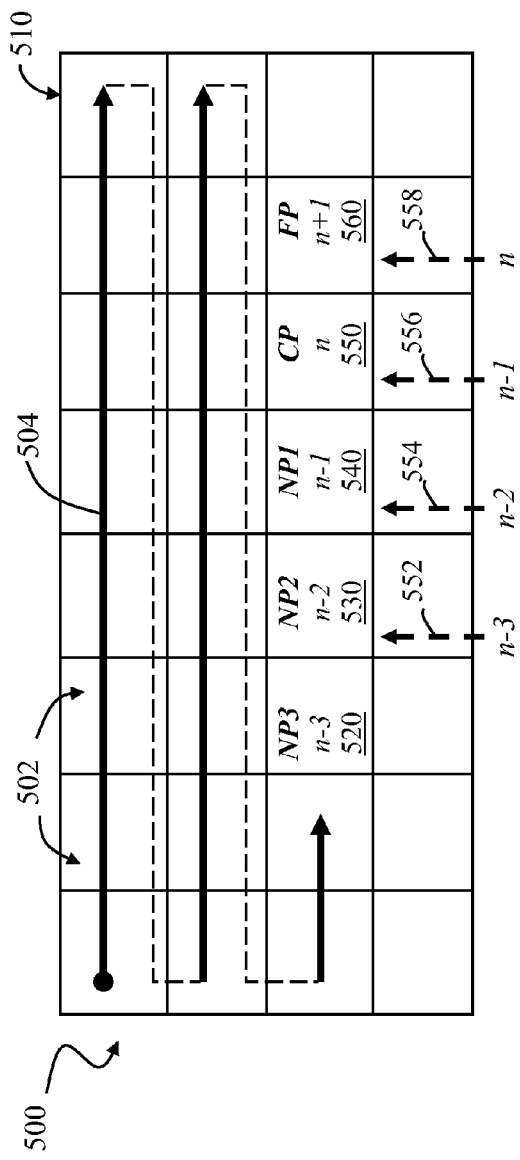
FIGS. 5A, 5B, 5C and 5D are area high-level diagrams representing a portion of an exemplary image being intra-coded, and with associated exemplary values, including quantization parameters, according to embodiments of the invention.

FIG. 5A is a high-level diagram 500 representing a portion of an exemplary image 510 being intra-coded, and with associated exemplary values, including neighbor_modes values, according to embodiments of the present invention. Each exemplary pixel is represented, for example, by a square 502 traversed by a scanning or process path 504. In this example, the current or input pixel being processed is pixel n 550, herein also referred to as the current pixel (CP) 550. The next pixel to be processed, n+1 560, after coding of the CP, is labeled as the future pixel (FP) 560. The manner of processing the pixels illustrated in FIG. 5A is for exemplification purposes only and one of ordinary skill in the art will appreciate that the order of processing pixels of an image may be varied (see, for example, FIGS. 1A-1C) and yet still be in the scope of the present invention.

Figure 5B:
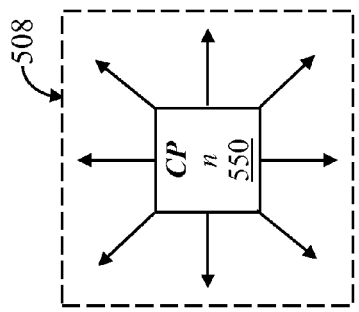

In an exemplary embodiment, the encoding subsystem or encoder module 300 and similarly the decoding subsystem or decoder module 400 may keep track of the coding modes of the three most recently processed or reconstructed pixels, e.g., pixel n−1 (NP1) 540, pixel n−2 (NP2) 530, and pixel n−3 (NP3) 520, for example, via a respective encoding mode buffer 365 (FIG. 3) and a decoding mode buffer 405 (FIG. 4). In some embodiments, the previous pixels are neighboring pixels, which may be proximate or adjacent to the input or current pixel being processed. FIG. 5B shows graphically that the neighboring pixels may be proximate or adjacent from various directions as shown in the exemplary diagram 508.

Although the exemplary embodiment of FIG. 5A is discussed in relation with the three most previously coded/reconstructed pixels 520, 530, 540, variations on the number of pixels may be applied and yet still be in the scope of the present invention. For example, only the most recently coded/reconstructed pixel may be applied—i.e., only one previous pixel, or the five most recently coded/reconstructed pixels may be applied to determine the neighbor_modes in order to determine the QP to be applied. Furthermore, the exemplary embodiments discussed herein typically have the predictor module 323 of the DPCM encoding subsystem (FIG. 3) and the predictor module 450 of the DPCM decoding subsystem (FIG. 4) generate their respective predicted error x̂(n) 314, 451 based on the most previous input sample, i.e., x(n−1). The predictor modules 323, 450 of the present invention may be adapted to determine or calculate the predicted error based on more than one previously coded sample, which may be obtained or accessed, for example, respectively from the pixel buffer 405 and the reconstructed pixel buffer 470.

In some embodiments, the coding mode buffers 365, 405 contain only the coding modes of previously coded/reconstructed, or quantized/inverse quantized, pixels that are applied to define the neighbor_modes parameter or variable. In other embodiments, the coding mode buffers 365, 405 may contain more coding modes, or quantization modes, than needed to define the neighbor_modes, i.e., there are coding modes that are not needed to define the current neighbor_modes.

Figure 5C:
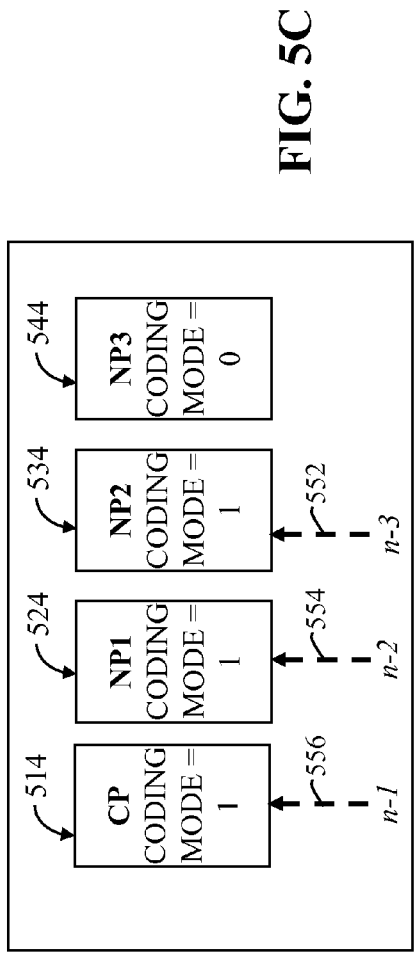
Figure 5D:
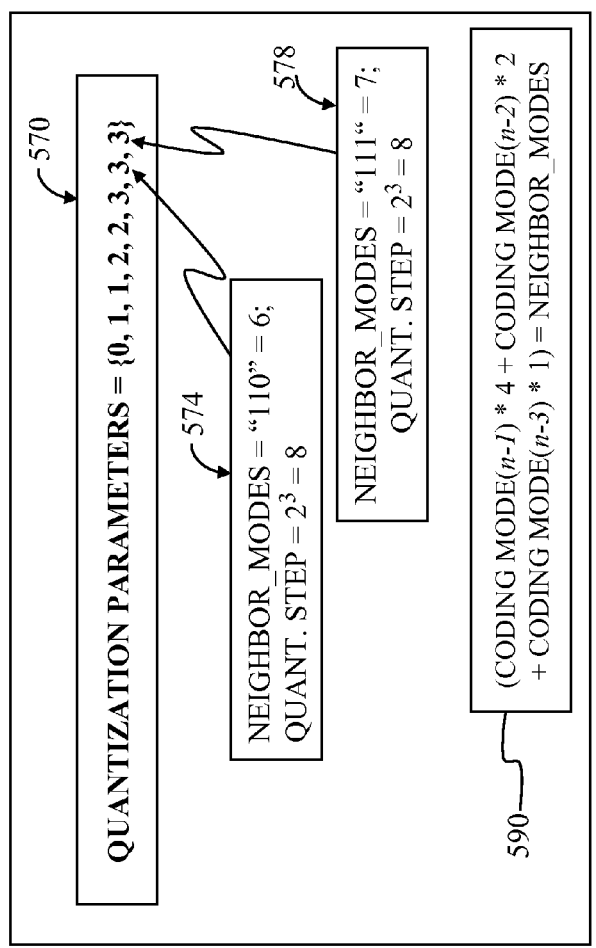

The one or more QPs are typically defined in the encoding subsystem or encoder module 300 and decoding subsystem or decoder module 400. Based on the coding mode buffers 365, 405, which contain the coding modes of previously coded and reconstructed pixels, a neighbor_modes value is determined which may then be applied respectively by the DPCM quantization parameters modules 360, 460 to determine the respective QP 367, 461. Described in another way, the QP may be based on a neighbor_modes value 366, 406, which is generally obtained from the coding modes of one or more previously coded/reconstructed neighboring pixels. The quantization parameters or QPs of an exemplary embodiment are shown listed with the following values: {0, 1, 1, 2, 2, 3, 3, 3} as illustrated in FIG. 5D. This exemplary list of QPs may be embodied in various forms, such as defined programmatically as part of the logic of a set of program instructions, e.g., hard-coded in software, may be implemented as one or more memory variables, such as a table, array, and/or data structure, or in other ways known to those of ordinary skill in the art. Three bits may represent up to eight QPs as shown in FIG. 5D in the quantization parameters block 570 and accordingly the eight QPs may provide for eight quantization steps. In this example, the QPs in general indicate the power or exponent to which the base, in our example, 2 is to be raised, thereby defining the quantization step. One of ordinary skill in the art, however, will appreciate that the QP may directly contain the quantization step value itself rather than just the exponent part.

Table I below shows the exemplary QPs of FIGS. 5C and 5D, and their associated neighbor_modes and quantization step values.

TABLE I

Exemplary Quantization Steps

| Neighbor_Modes bits (decimal) | Quantization Parameter | Quantization Step |
| --- | --- | --- |
| "000" = (0) | 0 | $2^0 = 1$ |
| "001" = (1) | 1 | $2^1 = 2$ |
| "010" = (2) | 1 | $2^1 = 2$ |
| "011" = (3) | 2 | $2^2 = 4$ |
| "100" = (4) | 2 | $2^2 = 4$ |
| "101" = (5) | 3 | $2^3 = 8$ |
| "110" = (6) | 3 | $2^3 = 8$ |
| "111" = (7) | 3 | $2^3 = 8$ |

To determine the coding modes of previous pixels, the coding mode of each of the previous three pixels for this example is applied, e.g., via bit concatenation, so as to determine or define the QP and/or the quantization step. For example, FIG. 5C shows that each of the previous pixels NP1 540, NP2 530, and NP3 520 has its coding mode set to "1" (PCM) 524, "1" (PCM) 534, and "0" (DPCM) 544, respectively. FIG. 5D illustrates that each coding mode may be concatenated to determine the QP. The concatenation of the coding modes, in this example, is "110"—i.e., "1" for NP1 524+"1" for NP2 534+"0" for NP3 544, with the most previous pixel, n−1 or NP1 540, having its coding mode 524, as the most significant bit. The binary "110" is equal to "6" in decimal and, as shown in Table I above, results in a QP of "3" and a quantization step of "8" and in the FIG. 574. In other embodiments, the neighbor_modes value may be obtained by performing the following calculation 590 (FIG. 5D): (coding mode(n−1)*4+coding mode(n−2)*2+coding mode(n−3)*1), where (n−1) denotes the coding mode of the previous ith pixel.

Continuing the example of FIG. 5A, the coding mode of the current pixel n 550—i.e., coding mode(n), after performing the quantization process of the present invention, is assigned the value of "1" (PCM) 514. At the next pixel processing, the next pixel FP 560 is now the current pixel n 558, the previous CP 550 is now the previous pixel (n−1) 556, the previous NP1 540 is now the previous pixel (n−2) 554, and the previous NP2 530 is now the previous pixel (n−3) 552. The QP from such coding modes 578 is "111," which is "7" in decimal, and results to a QP of "3" and a quantization step of "8" as shown in Table I and by FIG. 5D. The embodiments of the present invention thus reference the coding modes of one or more previously coded/reconstructed pixels to define the neighbor_modes to obtain the appropriate QP, including the quantization step. A different number of previous pixels, for example, four previous pixels may define up to sixteen possible quantization steps and such variations are still within the scope of the present invention. In other embodiments, if the quantization mode is based only on one previous pixel, such information may be tracked by setting an appropriate flag, for example, a one-bit flag which is associated to keep track of a previous reconstructed pixel. The flag, for example, may be set to "1" to indicate that the previous pixel is assigned a PCM coding mode or to "0" indicating DPCM mode.

Figure 6:
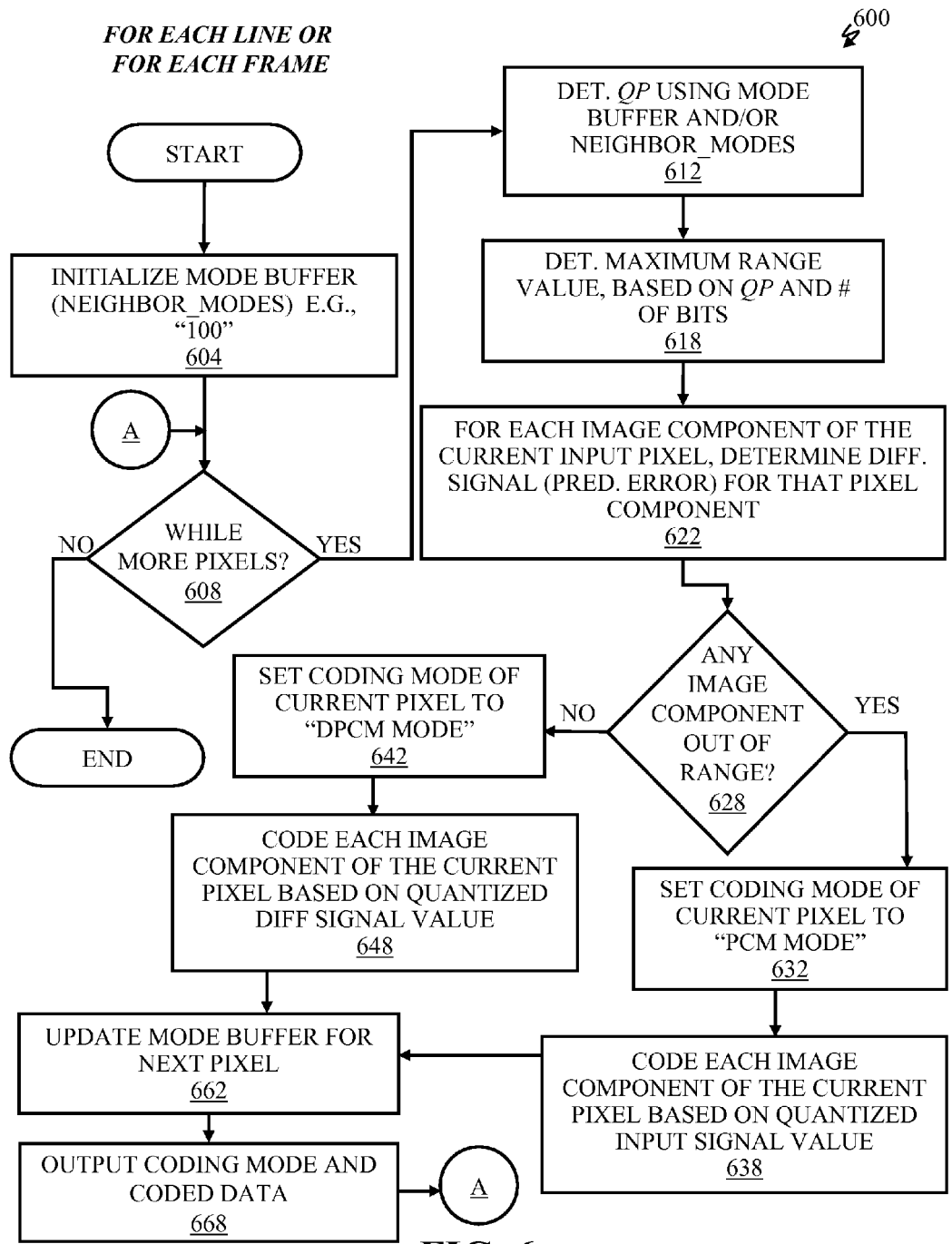
FIG. 6 is an exemplary flowchart of an exemplary encoding process embodiment of the invention.

FIG. 6 is a high-level flowchart of an exemplary quantization process 600 generally performed by the coder module 300, according to an embodiment of the present invention. One of ordinary skill in the art will appreciate that an image may be processed line by line or frame by frame, or by other image size delineation. Generally, this exemplary adaptive quantization process is applied for each line or for each frame, typically based on the implemented manner of processing the image. Furthermore, in this example, the input image is processed pixel by pixel. In this exemplary embodiment, each pixel or input is defined to be compressed to i number of bits, for example, five bits. The QP of the PCM data may also be defined.

In the course of applying the steps exemplified by the flowchart of FIG. 6 on a per frame basis, the first operation, e.g., an initializing step, may be performed for such a frame, for example, (step 604). Considering that the mode buffer 365 (FIG. 3) may be empty at this point, an initialization of the neighbor_modes parameter or variable may be appropriate. The mode buffer 365 and/or the neighbor_modes may be initialized to an appropriate value, e.g., "100" representing three previously coded pixels. The initialization value may be based on the number of previous pixels that influences the number of QPs and/or quantization index, and/or the value of the neighbor_modes. While there are more pixels to be processed, for example, for that frame (step 608, "yes" branch), the adaptive quantization process determines the QP, which may include the quantization step, to apply based on the neighbor_modes, derived from the coding modes of the appropriate number of previous pixels (see FIGS. 5A-5B, for example) (step 612). The mode buffer 365 as explained herein typically contains the coding modes of previous pixels defining the neighbor_modes.

Based on the determined QP, quantization step, a maximum range value is determined (step 618), which may be based on the number of coding bits and/or the QP. This maximum range value may be applied to determine if a value is out of range, e.g., there is an overflow or and underflow, e.g., an arithmetic overflow or underflow. Then, for each image component of the current input pixel, the DPCM encoding process determines the difference signal or predicted error for that image component of the current pixel (step 622). The maximum range value may be applied to determine a maximum positive value and a minimum negative value, for example. An image may have one or more image components, and in this example, a number of pixels. Each pixel, if it is a color pixel, may have three image components, e.g., red (R), green (G), and blue (B) components. In some embodiments, the image components of a pixel may be various level of grays or may be cyan (C), magenta (M), yellow (Y), and black (K) components.

If any of the difference signal/predicted error associated with any of the image components is out of range of the determined appropriate range of values, i.e., the value of the difference signal may cause an overflow or an underflow because such a value may not be accurately represented in the appropriate number of coding bits defined or allocated within the system (step 628, "yes" branch), the adaptive quantization process sets the coding mode of the current pixel, coding mode(n), to "PCM" mode or "1" (step 632). The current pixel is then accordingly coded as PCM data, i.e., coded as a quantized input signal value, x̃(n) (step 638). On the other hand, if no image component of the current pixel causes an overflow (step 628, "no" branch), the coding mode of current pixel is set to "DPCM" mode or "0" (step 642) and the current pixel is accordingly coded as DPCM data, i.e., as a quantized difference signal or prediction error, d̃(n) (step 648). The mode buffer 365 (FIG. 3) and/or neighbor_modes value is accordingly updated with the coding mode of the current pixel, in preparation for the next input pixel to be processed (step 662). The coding mode of the current pixel 306 and the coded data, e.g., x̃(n) 313 or d̃(n) 322, are then accordingly outputted (step 668), e.g., sent for storage in a frame buffer for further image processing. The steps are then repeated for the rest of the pixels for that frame. The mode buffer and/or neighbor_modes value applied for each iteration of the exemplary process are based on one or more previous pixels of that pixel being processed.

Figure 7:
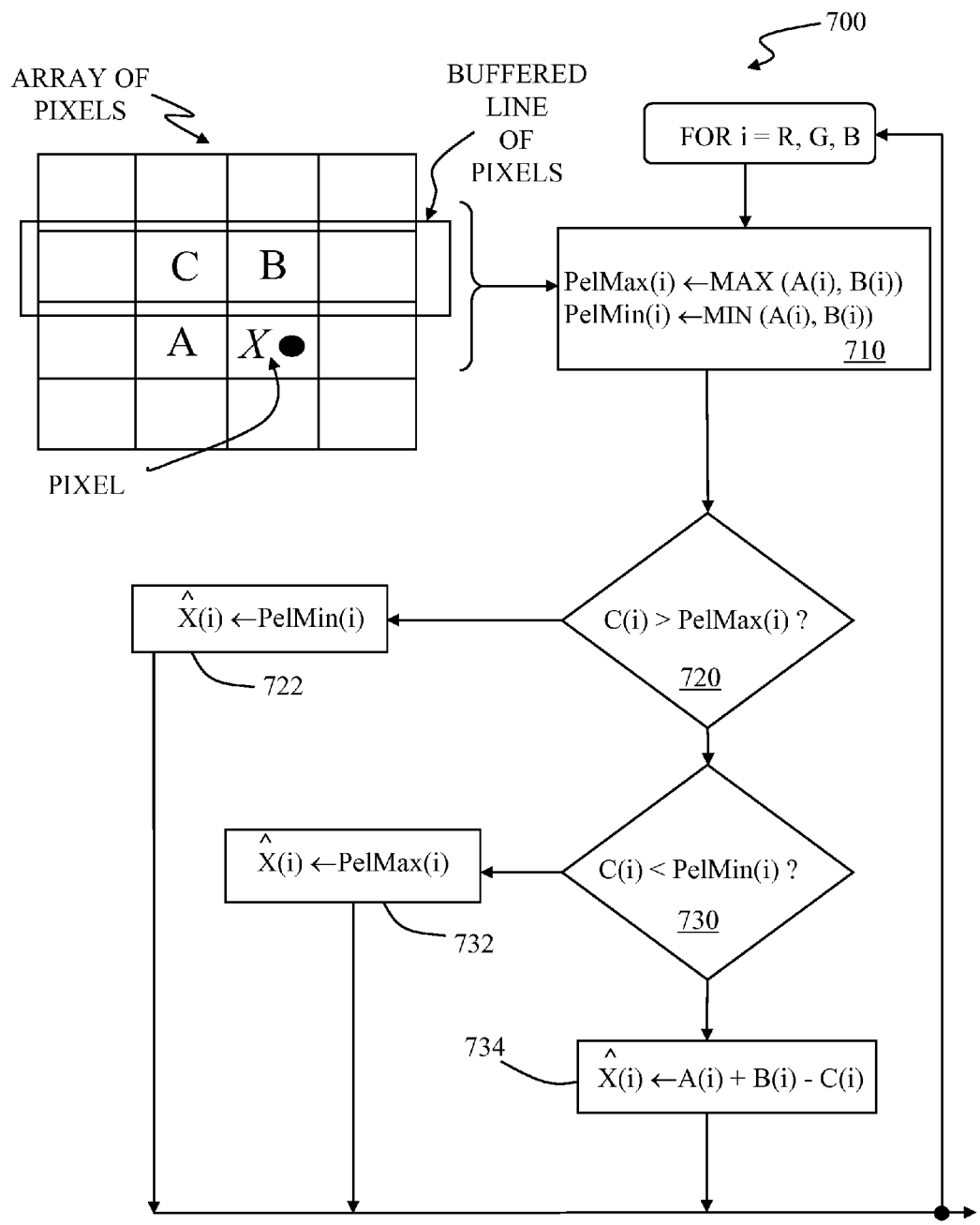
FIG. 7 is an exemplary flowchart of a prediction process embodiment according to an embodiment of the invention.

FIG. 7 is an exemplary flowchart embodiment 700 of a 2-D predicting process for a 2-D DPCM embodiment of the present invention where for each color component, the larger color component of pixels A and B established a maximum for X̂ and the smaller color component of pixels A and B establishes a minimum for X̂ and a range test for the color component of C (step 710). If the color component of C is greater than the maximum for X̂ (step 720), then X̂ is assigned the minimum for X̂ (step 722). If the color component of C is less than the minimum for X̂ (step 730), then X̂ is assigned the maximum for X̂ (step 732). If the color component of C is within or equal to these range limits, then X̂ is assigned the sum of the color component of A and B less the color component of C (step 734). Accordingly, FIG. 7 illustrates in flowchart form an exemplary process that may be applied to generate a prediction for each pixel component of the current pixel ("X"), X̂. In this example, based on a relative pixel set comprising the left pixel ("A"), the upper pixel ("B"), and the upper left pixel ("C"), a comparison is made between A and B, pixel color component by pixel color component and the larger of the two for each color components forms a reference vector, $P_{el,min}$ and the smaller of the two for each color component form a reference vector, $P_{el,min}$. If a color component of C is greater than the respective color component of $P_{el,max}$, then the corresponding color component of X̂ is set to the value of the respective color component of $\overline{P_{el,min}}$. If a color component of C is less than the respective color component of $P_{el,min}$, then the corresponding color component of X̂ is set to the value of the respective color component of $\overline{P_{el,max}}$. For each color component of C that does not exceed $P_{el,max}$ or is not less than $P_{el,min}$, the corresponding color component of X̂ is set to the value of the respective color components of $\overline{A}$ added to value of B less the value of C.

An exemplary 2-D DPCM encoding process may be illustrated by pseudo code in FIGS. 8A and 8B where terms of the pseudo code may be defined as follows:

a) BitsSent: Number of coding bits allocated for each data or input sample component. In this example, five coding bits are allocated. For the PCM mode, because the expected values are all positive numbers, hence, all five bits are applied to represent and code the input sample or pixel. For DPCM mode, the values are represented as two's complement, thus one bit is allocated as a sign bit, while the other four bits are allocated to store the value.

b) current_slag: Flag indicating the coding mode of the current input pixel, e.g., coding mode of x(n). In general, the current_flag represents the coding mode of the current input sample and may contain the value of "1" for the PCM encoding mode or "0" for the DPCM encoding mode. Typically, the current_flag is allocated one bit.

c) Quant: Quantization Parameter, where the quantization step size is defined as $2^{Quant}$ (=2^Quant).

d) Current_Data$_{color}$: Color component of the current input pixel, e.g., x(n), where color may be, in this example, R, G or B.

e) Previous_Data$_{color}$: Color component of the previous pixel, e.g., x(n−1), where color may be, in this example, R, G or B. Previous_Data$_{color}$ is typically a predicted value, e.g., x̂(n) 314 (FIG. 3) of that color component.

f) D$_{color}$: Difference signal or prediction error between Current_Data$_{color}$ and Previous_Data$_{color}$, e.g., d(n). Typically, Current_Data$_{color}$ may be the input sample value of that color component, while the Previous_Data$_{color}$ may be a predicted value.

g) OutOfRange$_{color}$: Flag indicating if difference signal/prediction error of that color component, D$_{color}$, is out of range, e.g., an overflow or underflow may occur considering there may not be enough bits to correctly contain the value of D$_{color}$, and where color may be, in this example, R, G or B.

h) QuantTable: In this exemplary embodiment, the QPs are defined via an exemplary Quantization Table, where QuantTable[ ]={0, 1, 1, 2, 2, 3, 3, 3}. As mentioned above, other processes and/or other software engineering techniques may be applied to perform the functions and/or features of a table, such as programmatically define such QPs as part of program logic, for example.

i) neighbor_modes: The value based on the coding modes of previous pixels (see FIG. 5C).

The exemplary 2-D DPCM encoding process may be illustrated by pseudo code in FIGS. 8A and 8B where the prediction, per pixel component, is based on color components of pixels A, B and C (FIG. 7). The prediction value for each color component is tested 810 and if out of range, a PCM encoding flag is set 812. A relative color component test is conducted (step 814) and if more than one relative color component test is positive then the quantization parameter of pixel B may be assigned (step 816) for encoding rather than, for example, the quantization parameter for the last encoded pixel, pixel C. Accordingly, the encoding may be in a PCM mode (step 820) (FIG. 8B) or in a DPCM mode (step 830).

Figure 9:
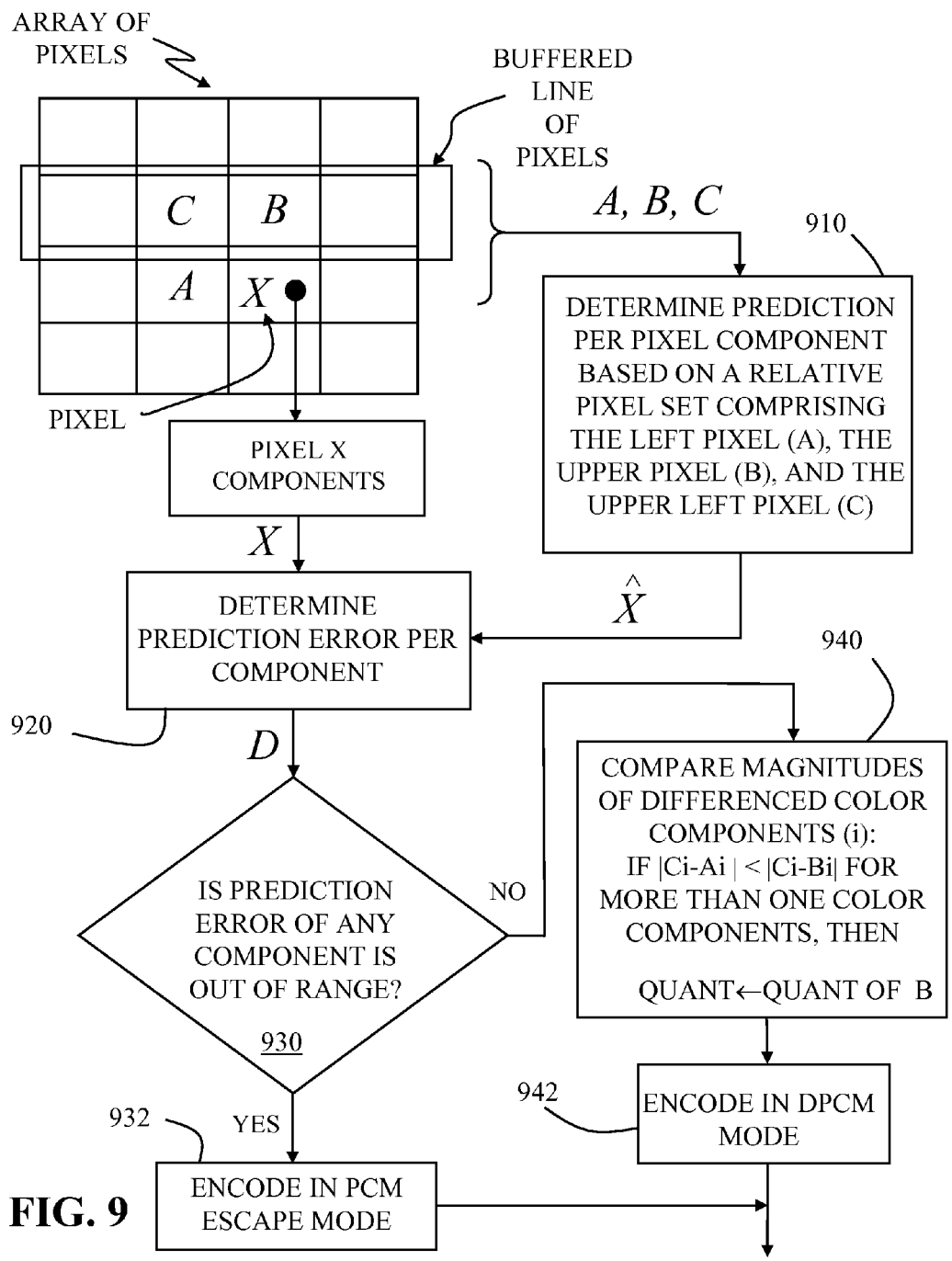
FIG. 9 is an exemplary flowchart of an encoding process embodiment according to an embodiment of the invention.

FIG. 9 is an exemplary flowchart of the encoding process where, for each component, a prediction is made (step 910)

and the prediction $\hat{X}$ (FIG. 10) is differenced (step 920) from the current pixel (X) color component to produce a prediction error, D. If the prediction error is out of range for any color component (test 930), then a flag is set (step 932) to encode the pixel components in PCM mode. Comparisons of relative pixel components (step 940) may be made to determine the quantization parameter for pixel X, the current pixel, and particularly for the encoding of the components of its prediction error, D (step 942). For pixel X, the PCM encoding of its pixel components may be based on a defined quantization parameter (e.g., QuantPCM) and underflow and overflow protective measures may be applied. As for DPCM mode, the magnitudes of difference color components are compared. The nominal quantization parameter for DPCM encoding is based on the QuantTable(neighbors_modes). The quantization parameter used for pixel X, particularly prediction error, D, may be the quantization parameter for pixel B (step 942), if, for more than one color component, the absolute value of the difference between C and A is less than the absolute value of the difference between C and B. For prediction error, D, the DPCM encoding may be based on a determine quantization parameter (e.g., Quant) and underflow and overflow protective measures may be applied. Accordingly, FIG. 9 is a high level flow chart illustrating an exemplary process to determine the mode of encoding for a pixel and encoding the pixel. The specific color that a pixel may represent may be some combination of three components of the color spectrum such as red, green and blue. Accordingly, red, green, and blue may be referenced as exemplary components of a pixel. By exploiting a preceding buffered line of the pixel and a proximate pixel of the same line, a system and process of the present invention may determine a prediction ($\hat{X}$), per image component. That is, based on a relative pixel set comprising the left pixel ("A"), the upper pixel ("B"), and the upper left pixel ("C"), a prediction may be determined for each pixel component of the current pixel ("X"). By comparing pixel components of $\hat{X}$ with the predicted pixel components, $\hat{X}$, one may determine the prediction error, per component, $\bar{d}$. The prediction error, d, may be tested, per component, against a range limit, $d_{limit}$. If at least one of the three exemplary prediction errors exceeds a range value, then the system may encode in PCM and transmit accordingly. For example, if the predicted red pixel component is above or below a range limit value, the system may encode in PCM for that pixel until the predicted red component falls within the range value.

An exemplary 2-D DPCM decoding, e.g., inverse quantizing, process may be illustrated by pseudo code in FIG. 10 where the prediction is shown in this example as generated 1010, per pixel component, is based on previously transmitted, decoded and buffered color components of pixels A, B and C (FIG. 9). A relative color component test is conducted 1020 and if more than one relative color component test is positive then the quantization parameter of pixel B may be assigned 1030 for encoding rather than, for example, the quantization parameter for the last encoded pixel, pixel C. Accordingly, the encoding may be in a PCM mode 1040 or in a DPCM mode 1050.

Figure 11:
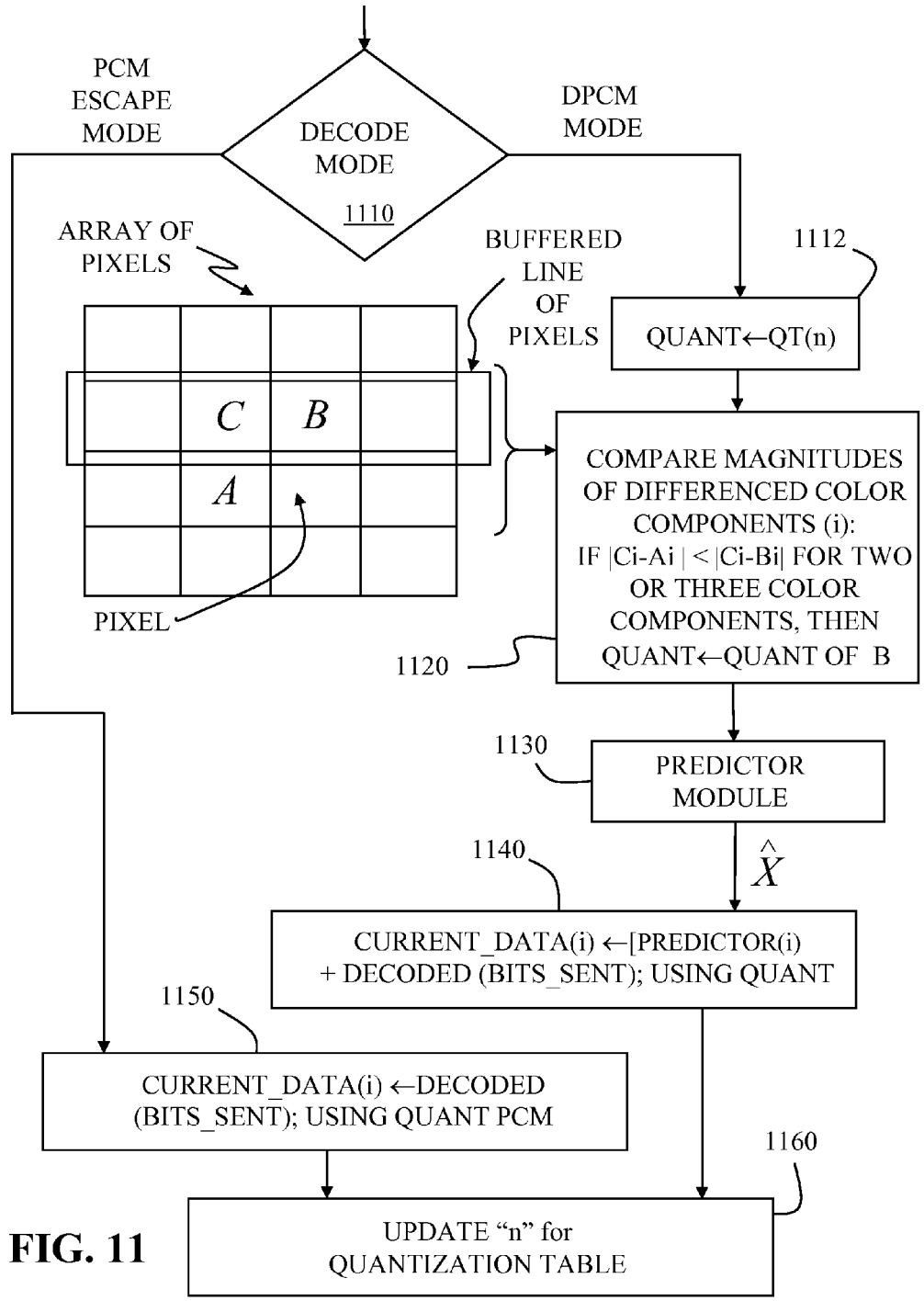
FIG. 11 is an exemplary flowchart of a decoding process embodiment according to an embodiment of the invention.

FIG. 11 is an exemplary flowchart of the decoding process where a flag may be tested (test 1110) as to whether the pixel data is to be decoded (inverse quantized) using PCM (due to the application of the PCM escape mode during encoding) or using DPCM. If the PCM flag is detected, then the pixel information (BITS_SENT) may be decoded (step 1150) using the defined quantization parameter (QUANTPCM) and neighbors_modes may be updated (step 1160) using the flag value. If the flag indicates the pixel data was encoded via the exemplary DPCM process, then the default quantization parameter may be drawn (step 1112) from the quantization table (QuantTable indexed according to neighbors_modes). For each component, the magnitudes of differenced color components are compared (step 1120). Comparisons are made (step 1120) similar to the encoding side of DPCM. The quantization parameter used for decoding the encoded prediction error, D, may be the quantization parameter for pixel B, if, for more than one color component, the absolute value of the difference between C and A is less than the absolute value of the difference between C and B. A prediction is generated (step 1130) where the prediction of X, $\hat{X}$ (FIG. 10), is based on previously transmitted, decoded and buffered color components of pixels A, B and C (FIG. 9). The encoded prediction error, D, is decoded (inverse quantized) (step 1140) using the determined quantization parameter and added to the prediction, $\hat{X}$, to reconstitute the pixel components of X and neighbors_modes may be updated using the flag value (step 1160). Accordingly, FIG. 11 illustrates in flowchart form an exemplary process to determine the mode of decoding for a pixel and decoding the encoded pixel and to adjust the quantization parameter. If the mode flag indicates PCM coding for that pixel, then for each color component, e.g., red, green, and blue, the bits are read and then decoded according to PCM quantization parameters. If the mode flag indicates DPCM for that pixel, then for each color component, a predictor process is applied to generate a prediction of the pixel at the receiving end. A process of comparing magnitudes of differenced color components of the relative pixel set, i.e., the left pixel, A, the upper pixel, B, and the upper left pixel, C, may be executed to determine whether the quantization parameters for the decoding should be drawn from a default quantization table or the quantization parameters of the upper pixel, B. For example, if the absolute color component value of C-A is less than the absolute value of C-B for two or three color components of the three exemplary color components, the quantization parameter for the current pixel will be drawn from the quantization parameters of the upper pixel, B. Having established the quantization parameter for decoding, the DPCM decoded pixel color components are each combined with the predicted pixel color components to produce the output pixel.

Figure 12:
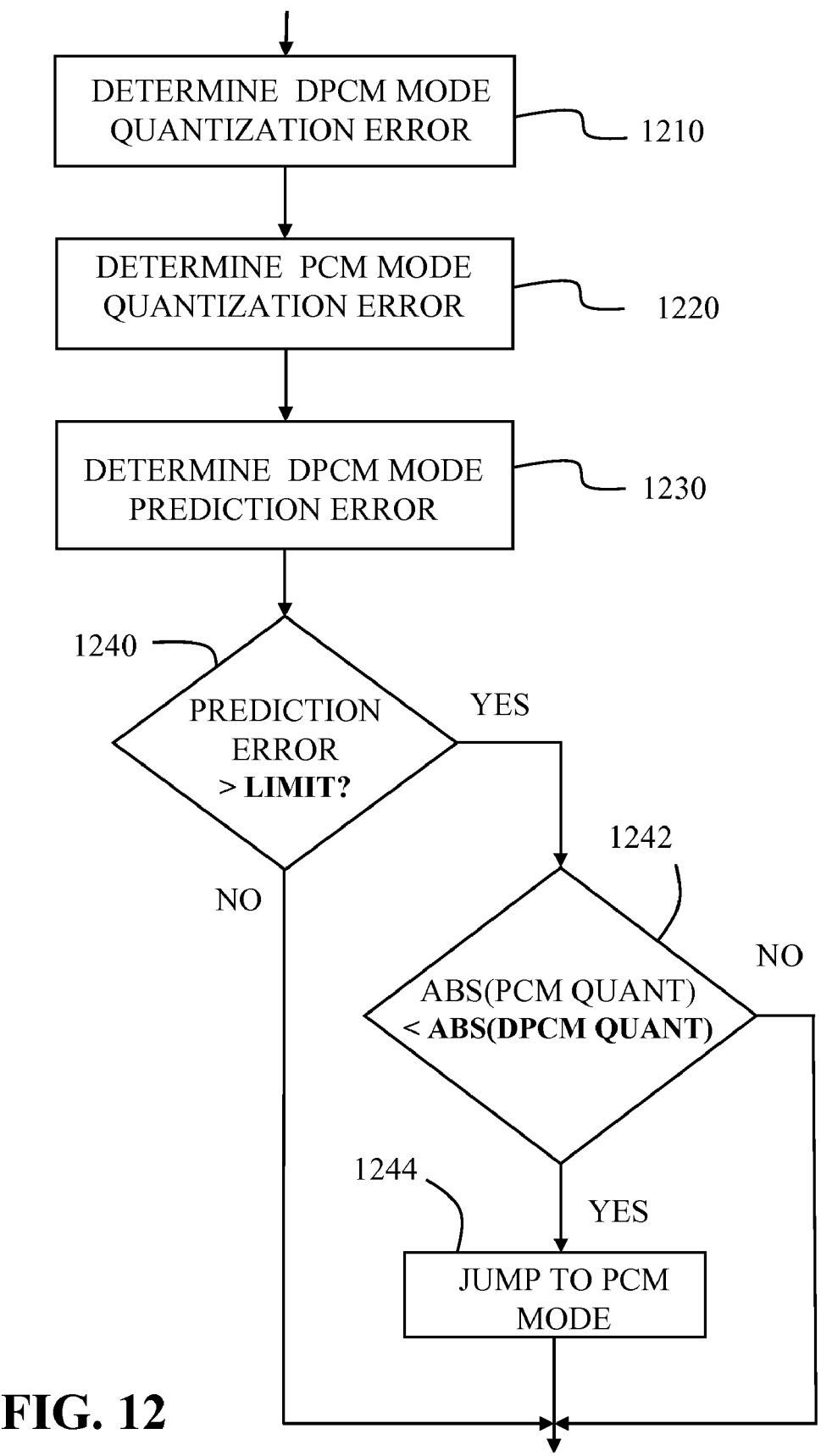
FIG. 12 is an exemplary flowchart of an additional embodiment for conditioning the jump or escape to PCM encoding mode.

FIG. 12 is a flowchart illustrating another encoding process embodiment where the quantization errors of the two-dimensional DPCM mode and of the PCM mode are compared. The exemplary process switches to PCM encoding mode for pixel color components only when the prediction error D is out of range for DPCM mode, e.g., for more than one color component, and the absolute value of the quantization error of the DPCM mode is greater than that of the PCM mode. Accordingly, FIG. 12 illustrates in flowchart form an exemplary process for changing the coding from a default DPCM to PCM. Referring to FIG. 3, whether the encoding of a pixel is to be via PCM or DPCM may be determined via an overflow/underflow testing process that may be based on the prediction error 326 and may also be based on the DPCM quantization error 322. In such a configuration, the first switch 331 may not be implemented in that the PCM quantization and the DPCM quantization may be done in parallel. Returning to FIG. 12, the process determines the DPCM quantization error (step 1210), the PCM mode quantization error (step 1220), and once the DPCM prediction error for the current pixel is available (step 1230) then tests (test 1240) the prediction error as to whether it is out of bounds. If the prediction error is out of bounds, a second (test 1242) is conducted as to whether the absolute value of the DPCM mode quantization error is greater than the PCM mode quantization error. If it is, then PCM encoding of the current pixel is invoked (step 1244).

Figure 13:
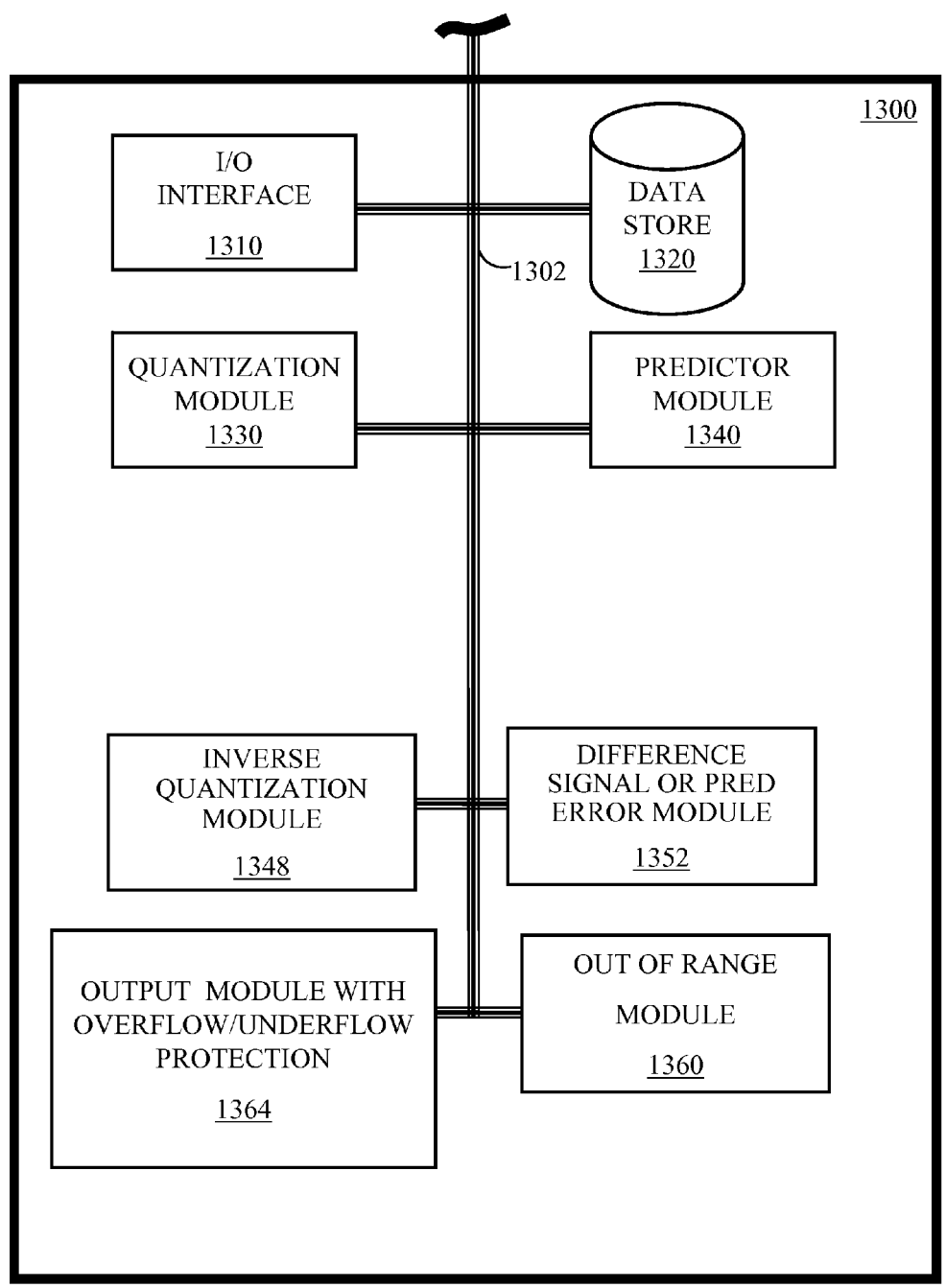
FIG. 13 is a block diagram of an exemplary device adapted to perform the quantization processes described herein, according to an embodiment of the invention.

FIG. 13 is a block diagram of an exemplary device 1300 adapted to perform the quantization and inverse quantization processes described herein, according to an embodiment of the invention. The exemplary device 1300 may include an input/output I/O interface card 1310 adapted to enable the device 1300 to communicate, including transmit and receive data, with other devices, such as with another image processing device. If the device 1300, however, is a stand-alone device, the I/O interface card 1310 may be omitted. The exemplary device 1300 may also include a data store 1320, which may be volatile or non-volatile memory, and may store data such as the neighbor pixel buffer 350 and the encoding (quantizing) mode buffer 365 (FIG. 3) and the reconstructed neighbor pixel buffer 470 and/or the decoding (inverse quantizing) mode buffer 405. Such a data store may also be remote and external to the device 1300. The exemplary device 1300 may also include a quantization module 1330 adapted to perform quantization functions and a predictor module 1340 adapted to determine predicted input values, as described above. The difference signal/prediction error module 1352 is adapted to determine the difference signal/prediction error. The out of range module 1360 may be adapted to determine if certain values, such as the quantized input sample value and/or the quantized difference signal value, are outside an appropriate range of values. This out of range module 1360 may also determine the appropriate range of values. The decoding (inverse quantization) module 1348 may be adapted to perform decoding inverse quantization operations whether for PCM or DPCM. The output module 1364 may be adapted to output the coding mode 305 and the coded data 306 (FIG. 3), with optional out of range correction processing, such as underflow and/or overflow correction processing. In some embodiments of the invention, the different modules in FIG. 13 may communicate and interface with each other via a bus, dedicated signal paths or one or more channels 1302.

Depending on the function of the device 1300, other modules, including functions and capabilities, may be added, removed, and/or modified. The modules in the exemplary device described herein may be modified, such as further subdivided and combined with other functions so long as the function and processes described herein may be performed. Furthermore, a communications module adapted to enable streaming output to be transmitted to a receiving device, e.g., decoder, may also be included. The exemplary device, for example, may also include an absolute quantization module adapted to determine the quantization error of the quantized difference sample and/or the quantized input sample, depending on the adaptive quantization process that the device is adapted to perform. The various modules may also be implemented in hardware—e.g., circuits, chips, and/or as a specialized computing device, as a set of program instructions, e.g., software, or both, i.e., firmware. The exemplary module 1300 may be both a coder, and a decoder, depending on the modules included in the exemplary device.

Figure 14:
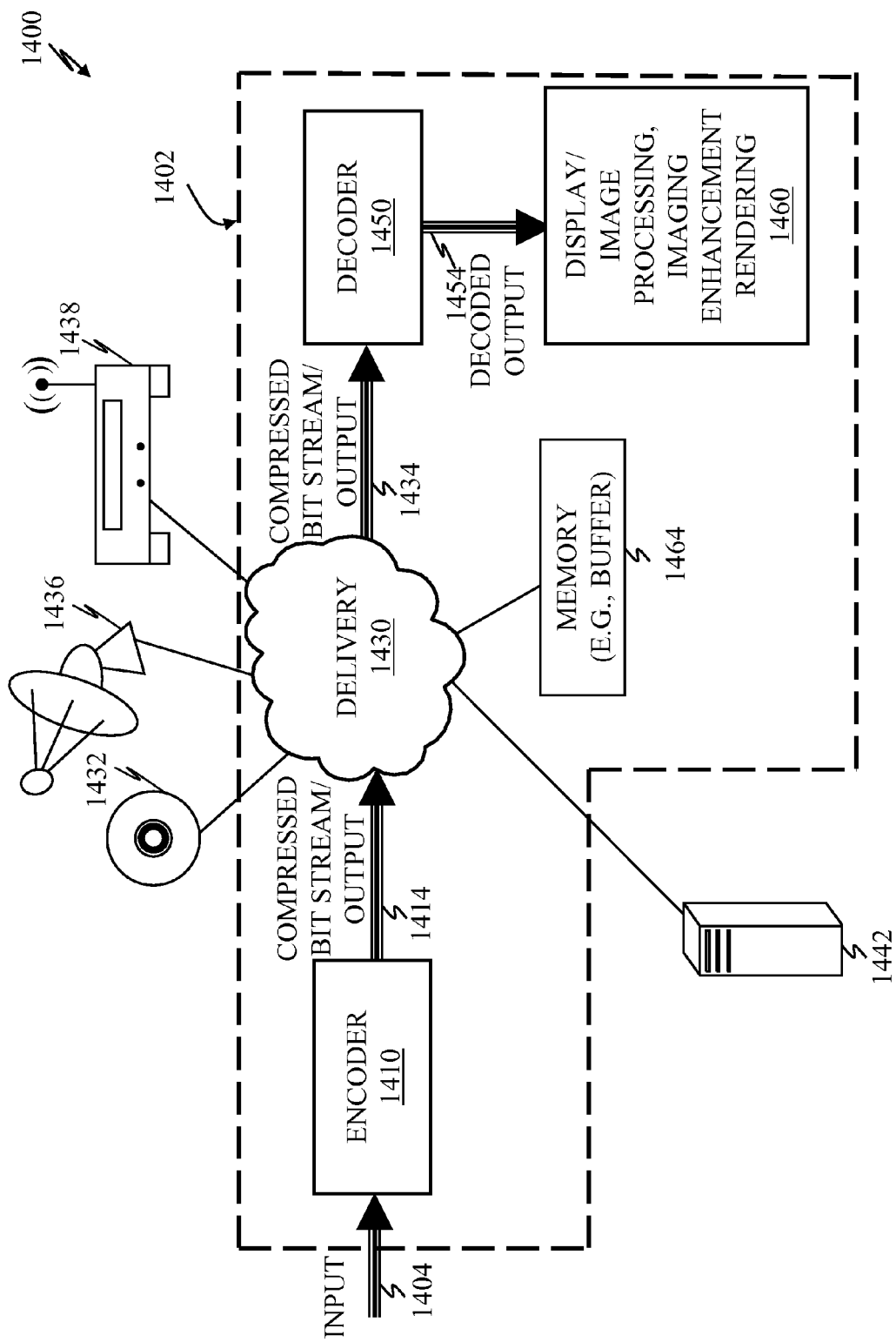
FIG. 14 is a high-level block diagram of an exemplary quantization system and/or device, according to embodiments of the invention.

FIG. 14 is an exemplary system 1400 according to an embodiment of the invention. The system 1400 typically includes a coder 1410, a delivery or transport medium 1430, and a decoder 1450. The encoder 1410 receives input signals 1404, which may be in analog or digital form, and may be in an uncompressed form typically. These signals, which may be an image or a sequence of images, may then be coded and compressed by an encoder 1410 of the present invention adapted to perform the one or more encoding/quantization processes and the one or more decoding/inverse quantization processes of the present invention. In some embodiments, the encoder 1410, the decoder 1450, or both are embodied as codecs. A codec in general is a device or a set of program instructions, e.g., software, adapted to encode and decode digital data stream or signal. The compressed bit stream 1414 or the coded output compressed by the encoder 1410 is then typically delivered via a delivery or transport medium 1430. The coded output as discussed above includes the coding modes and their associated coded data. The delivery medium 1430 may include broadcast 1436, e.g., cable, terrestrial, or satellite broadcast, a wide area network such as the Internet, and a wired and/or wireless medium, which may include a delivery medium, for example, to memory 1464, which may be local or remote to the encoder 1410. In other embodiments, the transport medium is a digital versatile or video disc (DVD) 1432, a set-top box 1438, or a media server 1442. Other embodiments of delivering the compressed bit stream or output 1414 are known to those of ordinary skill in the art. In some embodiments, the compressed bit stream or output 1414, 1434 may include other information, e.g., when packetized for transmission over the Internet. The compressed bit stream/output 1434 is then received by the decoder 1450, which then decodes the compressed bit stream, based on the coding modes received, to obtain a decoded output 1454 for further image enhancement processing, rendering, or presentation 1460, or any other image processing operations.

In some embodiments, the system as shown in FIG. 14 may be embodied in one device 1402, outlined by the dashed lines, where such a device includes the encoder module 1410, a memory 1464, and a decoder module 1450. For example, an input of 60 frames per second may be reduced by the encoder 1410 of the present invention to 30 frames per second, and stored temporarily in memory 1464, while waiting for the decoder 1450 to decode such input signals for further image processing, for example, for high-definition imaging applications. By using the adaptive quantization features described herein, the memory size 1464 may potentially be reduced by half. The delivery medium 1430 in this exemplary device 1402 may be dedicated signal paths, shared memory, bus, channels, and other means as known to those of ordinary skill in the art.

Embodiments of the present invention may be used in conjunction with other coding systems, devices, and processes that perform intra-coding. Although this invention has been disclosed in the context of certain embodiments and examples, it will be understood by those of ordinary skill in the art that the present invention extends beyond the specifically disclosed embodiments to other alternative embodiments and/or uses of the invention and obvious modifications and equivalents thereof. For example, although the embodiments of the present invention are discussed herein in relation to an image with R, G, and B components, the embodiments of the present invention may also apply to other images with other image components, such as black and white, grayscale, and cyan-magenta-yellow-black (CMYK) images. Furthermore, the quantization index may be modified such that it may be based on a different number of previous pixels. Furthermore, the number of quantization parameters and/or steps may be varied, such as whether, based on the mode flag, portions of PCM processing may be done in parallel or exclusive of DPCM processing, and yet still be in the scope of the present invention. Furthermore, the values of the quantization size parameters may be modified. One of ordinary skill in the art will also appreciate that the modules and functions described herein may be further subdivided, combined, and/or varied and yet still be in the spirit of the embodiments of the invention. In addition, while a number of variations of the invention have been shown and described in detail, other modifications, which are within the scope of this invention, will be readily apparent to those of ordinary skill in the art based upon this disclosure, e.g., the exemplary flowcharts or processes described herein may be modified and varied and yet still be in the spirit of the invention. It is also contemplated that various combinations or subcombinations of the specific features and aspects of the embodiments may be made and still fall within the scope of the invention. Accordingly, it should be understood that various features and aspects of the disclosed embodiments can be combined with or substituted for one another in order to form varying modes of the disclosed invention. Thus, it is intended that the scope of the present invention herein disclosed should not be limited by the particular disclosed embodiments described above.

What is claimed is:

1. A method of processing a pixel of an array of pixels, the pixels each comprised of a plurality of pixel components, the method comprising:
   buffering a first set of pixels according to a first array scan direction;
   buffering a second set of pixels according to a second array scan direction;
   encoding a current pixel for buffering to become a member of the second set of pixels,
   wherein, for each current pixel component, the encoding comprises:
      predicting a current pixel component based on a pixel component of a last buffered pixel of the second set of pixels and a pixel component of at least one pixel of the first set of pixels proximate to the current pixel;
      differencing the predicted current pixel component and the current pixel component to generate a current pixel component difference; and
      if the current pixel component difference exceeds a threshold, then
         quantizing each current pixel component of the current pixel to generate a quantized current pixel and
         combining the quantized current pixel with a pulse code modulation (PCM) indicator indicating a coding mode for transmission; and
      if the current pixel component difference does not exceed the threshold, then
         determining a set of magnitudes of differenced buffered pixel components of the first set of pixels and the second set of pixels;
         determining the quantization parameter of the current pixel for buffering, the determining based on: selecting the larger in magnitude of the determined set of pixel component magnitudes and coding modes of one or more previously quantized neighboring pixels wherein the coding modes of the one or more previously quantized neighboring pixels is concatenated to determine a quantization step; and
         quantizing each current pixel component difference, based on the determined quantization parameter and the determined quantization step, to generate a quantized current pixel difference, and combining the quantized current pixel difference with a differential pulse code modulation (DPCM) indicator indicating a coding mode for transmission.

2. The method of claim 1 wherein the quantizing of each current pixel component difference is based on one or more differences between a pixel component of the last buffered pixel of the second set of pixels and a pixel component of at least one pixel of the first set of pixels proximate to the current pixel.

3. The method of claim 2 wherein the first set of pixels proximate to the current pixel comprises a first pixel, and wherein the first pixel is spatially abutting the current pixel.

4. The method of claim 3 wherein the first set of pixels proximate to the current pixel comprises a second pixel, and wherein the second pixel is spatially abutting the last buffered pixel and the first pixel of the first set of pixels.

5. The method of claim 4 wherein the quantizing is based on:
   differencing at least two color components of at least three pixels of a set of pixels, wherein the set of pixels comprises: the last buffered pixel and two pixels of the first set of pixels spatially proximate to the current pixel;
   determining a set of magnitudes for each color component based on a compared difference of at least two color components of the set of pixels; and
   generating a quantized current pixel difference based on the quantized first pixel, wherein the first pixel is spatially abutting the current pixel.

6. The method of claim 2 wherein the first set of pixels proximate to the current pixel comprises a first pixel, and wherein the first pixel is spatially abutting the last buffered pixel.

7. The method of claim 6 wherein the first set of pixels proximate to the current pixel comprises a second pixel, and wherein the second pixel is spatially abutting the current pixel and the first pixel of the first set of pixels.

8. The method of claim 1 wherein the steps of quantizing each current pixel component of the current pixel to generate a quantized current pixel and combining the quantized current pixel with a pulse code modulation (PCM) indicator for transmission are executed if either: (a) the current pixel component difference exceeds a threshold or (b) the absolute value of DPCM quantization error exceeds the absolute value of PCM quantization error.

9. The method of claim 1 wherein the coding modes are updated in a mode buffer, the mode buffer comprising the coding modes of previously encoded pixels.

10. The method of claim 1 wherein the threshold is based on whether a value is accurately represented in an appropriate number of coding bits defined within a system.

11. The method of claim 1 wherein the quantization parameter indicates the exponent to which a base number is to be raised, thereby defining the quantization step.

12. A method of processing a pixel of an array of pixels, the pixels each comprised of a plurality of pixel components, the method comprising:
   buffering a first set of pixels comprising decoded pixel components according to a first array scan direction;
   buffering a second set of pixels comprising decoded pixel components according to a second array scan direction;
   receiving data comprising a quantizing indicator and pixel data;
   if the quantizing indicator is a pulse code modulation (PCM) indicator, then inverse quantizing the pixel data as a quantized current pixel;
   if the quantizing indicator is a differential pulse code modulation (DPCM) indicator, then:
      inverse quantizing the pixel data as a quantized current pixel component difference to generate an inverse quantized current pixel component difference;
      determining a set of magnitudes of differenced buffered pixel components of the first set of pixels and the second set of pixels;

determining the quantization parameter of the current pixel for buffering, the determining based on selecting the larger in magnitude of the determined set of pixel component magnitudes and coding modes of one or more previously inverse quantized neighboring pixels wherein the coding modes of the one or more previously inverse quantized neighboring pixels is concatenated to determine a quantization step;

predicting a current pixel component based on the determined quantization parameter, a decoded pixel component of a last buffered pixel of the second set of pixels, and a decoded pixel component of at least one pixel of the first set of pixels proximate to the current pixel;

summing the predicted current pixel component and the inverse quantized current pixel component difference to generate a current decoded pixel component; and buffering the current decoded pixel component.

13. The method of claim 12 wherein the inverse quantizing of each current pixel component difference is based on one or more differences between a buffered decoded pixel component of the last buffered decoded pixel of the second set of pixels and a buffered decoded pixel component of at least one pixel of the first set of buffered pixels proximate to the current pixel.

14. An apparatus for processing a pixel of an array of pixels, the pixels each comprised of a plurality of pixel components, the apparatus comprising:

a processing subsystem and addressable memory wherein the addressable memory is adapted to buffer a first set of pixels according to a first array scan direction and a second set of pixels according to a second array scan direction; and wherein the processing subsystem is adapted to:

encode a current pixel for buffering to become a member of the second set of pixels, wherein, for each current pixel component, the processing subsystem is adapted to:

predict a current pixel component based on a pixel component of a last buffered pixel of the second set of pixels and a pixel component of at least one pixel of the first set of pixels proximate to the current pixel;

difference the predicted current pixel component and the current pixel component to generate a current pixel component difference; and if the current pixel component difference exceeds a threshold, then quantize each current pixel component of the current pixel to generate a quantized current pixel and combine the quantized current pixel with a pulse code modulation (PCM) indicator indicating a coding mode for transmission; and if the current pixel component difference does not exceed the threshold, then determine a set of magnitudes of differenced buffered pixel components of the first set of pixels and the second set of pixels;

determine the quantization parameter of the current pixel for buffering, the determining based on selecting the larger in magnitude of the determined set of pixel component magnitudes and coding modes of one or more previously quantized neighboring pixels wherein the coding modes of the one or more previously quantized neighboring pixels is concatenated to determine a quantization step; and quantize each current pixel component difference, based on the determined quantization parameter and the determined quantization step, to generate a quantized current pixel difference, and combine the quantized current pixel difference with a differential pulse code modulation (DPCM) indicator indicating a coding mode for transmission.

15. The apparatus of claim 14 wherein the processing subsystem is further adapted to quantize each current pixel component difference based on one or more differences between a pixel component of the last buffered pixel of the second set of pixels and a pixel component of at least one pixel of the first set of pixels proximate to the current pixel.

16. The apparatus of claim 14 wherein the processing subsystem is further adapted to quantize each current pixel component of the current pixel to generate a quantized current pixel and combining the quantized current pixel with a pulse code modulation (PCM) indicator for transmission if either: (a) the current pixel component difference exceeds a threshold or (b) the absolute value of DPCM quantization error exceeds the absolute value of PCM quantization error.

17. An apparatus for processing a pixel of an array of pixels, the pixels each comprised of a plurality of pixel components, the apparatus comprising:

a processing subsystem and addressable memory wherein the addressable memory is adapted to buffer: a first set of pixels comprising decoded pixel components according to a first array scan direction; a second set of pixels comprising decoded pixel components according to a second array scan direction; and a current decoded pixel component; and wherein the processing subsystem is adapted to:

receive data comprising an encoding indicator and pixel data;

inverse quantize the pixel data as a quantized current pixel if the inverse quantizing indicator is a pulse code modulation (PCM) indicator; and if the inverse quantizing indicator is a differential pulse code modulation (DPCM) indicator, then the processing subsystem is adapted to:

inverse quantize the pixel data as a quantized current pixel component difference to generate a inverse quantized current pixel component difference;

determine a set of magnitudes of differenced buffered pixel components of the first set of pixels and the second set of pixels;

determine the quantization parameter of the current pixel for buffering based on selecting the larger in magnitude of the determined set of pixel component magnitudes and coding modes of one or more previously inverse quantized neighboring pixels wherein the coding modes of the one or more previously inverse quantized neighboring pixels is concatenated to determine a quantization step;

predict a current pixel component based on the determined quantization parameter, a decoded pixel component of a last buffered pixel of the second set of pixels, and a decoded pixel component of at least one pixel of the first set of pixels proximate to the current pixel; and sum the predicted current pixel component and the decoded current pixel component difference to generate a current decoded pixel component.

18. The apparatus of claim 17 wherein the processing subsystem is adapted to inverse quantize each current pixel component difference based on one or more differences between a buffered decoded pixel component of the last buffered decoded pixel of the second set of pixels and a buffered decoded pixel component of at least one pixel of the first set of buffered pixels proximate to the current pixel.

19. A system for processing a pixel of an array of pixels, the pixels each comprised of a plurality of pixel components, the system comprising:
at least one processing subsystem having addressable memory wherein the addressable memory is adapted to buffer a first set of pixels according to a first array scan direction and a second set of pixels according to a second array scan direction; and
wherein the at least one processing subsystem is adapted to:
encode a current pixel for buffering to become a member of the second set of pixels, wherein, for each current pixel component, the processing subsystem is adapted to:
predict a current pixel component based on a pixel component of a last buffered pixel of the second set of pixels and a pixel component of at least one pixel of the first set of pixels proximate to the current pixel;
difference the predicted current pixel component and the current pixel component to generate a current pixel component difference; and
if the current pixel component difference exceeds a threshold, then
quantize each current pixel component of the current pixel to generate a quantized current pixel and
combine the quantized current pixel with a pulse code modulation (PCM) indicator indicating a coding mode for transmission; and
if the current pixel component difference does not exceed the threshold, then
determine a set of magnitudes of differenced buffered pixel components of the first set of pixels and the second set of pixels;
determine the quantization parameter of the current pixel for buffering, the determining based on selecting the larger in magnitude of the determined set of pixel component magnitudes and coding modes of one or more previously quantized neighboring pixels wherein the coding modes of the one or more previously quantized neighboring pixels is concatenated to determine a quantization step; and
quantize each current pixel component difference, based on the determined quantization parameter and the determined quantization step, to generate a quantized current pixel difference, and combine the quantized current pixel difference with a differential pulse code modulation (DPCM) indicator indicating a coding mode for transmission; and
wherein the addressable memory is further adapted to buffer: the first set of pixels comprising decoded pixel components according to the first array scan direction; the second set of pixels comprising decoded pixel components according to the second array scan direction; and a current decoded pixel component; and
wherein the at least one processing subsystem is further adapted to:
receive data comprising a quantizing indicator and pixel data;
inverse quantize the pixel data as a quantized current pixel if the quantizing indicator is a pulse code modulation (PCM) indicator; and
if the quantizing indicator is a differential pulse code modulation (DPCM) indicator, then the processing subsystem is adapted to:
inverse quantize the pixel data as a quantized current pixel component difference to generate an inverse quantized current pixel component difference;
determine a set of magnitudes of differenced buffered pixel components of the first set of pixels and the second set of pixels;
determine the quantization parameter of the current pixel for buffering based on selecting the larger in magnitude of the determined set of pixel component magnitudes and coding modes of one or more previously inverse quantized neighboring pixels wherein the coding modes of the one or more previously inverse quantized neighboring pixels is concatenated to determine a quantization step;
predict a current pixel component based on the determined quantization parameter, a decoded pixel component of a last buffered pixel of the second set of pixels, and a decoded pixel component of at least one pixel of the first set of pixels proximate to the current pixel; and
sum the predicted current pixel component and the inverse quantized current pixel component difference to generate a current decoded pixel component.

20. The system of claim 19 wherein the at least one processing subsystem is further adapted to quantize each current pixel component difference based on one or more differences between a pixel component of the last buffered pixel of the second set of pixels and a pixel component of at least one pixel of the first set of pixels proximate to the current pixel.

21. The system of claim 19 wherein the at least one processing subsystem is further adapted to inverse quantize each current pixel component difference based on one or more differences between a buffered decoded pixel component of the last buffered inverse quantized pixel of the second set of pixels and a buffered decoded pixel component of at least one pixel of the first set of buffered pixels proximate to the current pixel.

22. The system of claim 19 wherein the at least one processing subsystem is further adapted to quantize each current pixel component of the current pixel to generate a quantized current pixel and combining the quantized current pixel with a pulse code modulation (PCM) indicator for transmission if either: (a) the current pixel component difference exceeds a threshold or (b) the absolute value of DPCM quantization error exceeds the absolute value of PCM quantization error.

* * * * *